(12) United States Patent
Yamashita

(10) Patent No.: US 11,040,724 B2
(45) Date of Patent: Jun. 22, 2021

(54) VEHICLE DRIVING FORCE CONTROL APPARATUS

(71) Applicant: TOYOTA JIDOSHA KABUSHIKI KAISHA, Toyota (JP)

(72) Inventor: Takaya Yamashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 16/398,415

(22) Filed: Apr. 30, 2019

(65) Prior Publication Data

US 2019/0344802 A1 Nov. 14, 2019

(30) Foreign Application Priority Data

May 8, 2018 (JP) .............................. JP2018-089681

(51) Int. Cl.
*B60W 50/08* (2020.01)
*B60W 30/14* (2006.01)

(52) U.S. Cl.
CPC ........ *B60W 50/087* (2013.01); *B60W 30/146* (2013.01); *B60W 2540/106* (2013.01)

(58) Field of Classification Search
CPC ...... G10K 11/16; G10K 11/162; G10L 15/22; G10L 2015/223; B60W 2540/106; B60W 30/146; B60W 50/087
See application file for complete search history.

(56) References Cited

U.S. PATENT DOCUMENTS

| 7,706,953 B1 * | 4/2010 | Sun ...................... B60K 31/042 |
| | | 701/93 |
| 7,853,385 B2 * | 12/2010 | Ly ....................... F16H 61/0213 |
| | | 701/51 |
| 7,957,884 B2 * | 6/2011 | Wakashiro ............. B60K 6/448 |
| | | 701/93 |
| 9,096,216 B1 * | 8/2015 | Kucharski ........... F16H 61/0213 |
| 2001/0024062 A1 * | 9/2001 | Yoshino ................... B60K 6/54 |
| | | 303/152 |

(Continued)

FOREIGN PATENT DOCUMENTS

| JP | 08-200111 A | 8/1996 |
| JP | 08200111 A * | 8/1996 |

(Continued)

*Primary Examiner* — Babar Sarwar
(74) *Attorney, Agent, or Firm* — Sughrue Mion, PLLC

(57) ABSTRACT

The vehicle driving force control apparatus executes a mistaken press-down driving force control for setting an upper limit as an initial upper limit for limiting driving force when a mistaken press-down operation of an acceleration pedal is detected. The control apparatus executes a limitation level reduction control when a predetermined vehicle movement is not detected while the mistaken press-down driving force control is executed, and the acceleration pedal is operated. The limitation level reduction control is realized by repeatedly executing a process for limiting the driving force to a first upper limit larger than the initial upper limit for a first period of time and then, limiting the driving force to a second upper limit smaller than the first upper limit for a second period of time. The first upper limit increases as the number of executing the upper limit change process increases.

14 Claims, 11 Drawing Sheets

(56) References Cited

U.S. PATENT DOCUMENTS

| | | | | |
|---|---|---|---|---|
| 2004/0204872 | A1* | 10/2004 | Kato | G01C 19/56 |
| | | | | 702/56 |
| 2010/0145559 | A1* | 6/2010 | Gauthier | B60W 10/08 |
| | | | | 701/22 |
| 2015/0033357 | A1* | 1/2015 | Habel | G06F 21/60 |
| | | | | 726/26 |
| 2015/0134168 | A1* | 5/2015 | Kawakami | B60W 30/143 |
| | | | | 701/22 |
| 2015/0224993 | A1* | 8/2015 | Ono | B60W 10/107 |
| | | | | 701/54 |
| 2016/0375794 | A1* | 12/2016 | Nishida | B60W 30/18072 |
| | | | | 701/22 |
| 2017/0327096 | A1* | 11/2017 | Mochida | B60W 30/146 |
| 2018/0264971 | A1* | 9/2018 | Lor | B60L 15/20 |
| 2019/0009775 | A1* | 1/2019 | Ito | B60T 7/22 |
| 2020/0139986 | A1* | 5/2020 | Hoshiya | B60W 50/038 |
| 2020/0309042 | A1* | 10/2020 | Otsubo | B60W 50/10 |
| 2020/0391765 | A1* | 12/2020 | Jia | B60W 50/029 |

FOREIGN PATENT DOCUMENTS

| | | | |
|---|---|---|---|
| JP | 2003-254111 A | | 9/2003 |
| JP | JP-2003254111 A | * | 9/2003 |
| JP | 2013-155631 A | | 8/2013 |
| JP | 2013155631 A | * | 8/2013 |

\* cited by examiner

VEHICLE DRIVING FORCE CONTROL APPARATUS

BACKGROUND

Field

The invention relates to a vehicle driving force control apparatus for limiting a driving force applied to a vehicle in response to a detection of a mistaken press-down operation that a driver of the vehicle presses down an acceleration pedal mistakenly.

Description of the Related Art

There is known a technique for preventing the vehicle from starting to move suddenly in response to the mistaken press-down operation that the driver of the vehicle presses down the acceleration pedal mistakenly. A driving assist apparatus proposed, for example, in JP 2013-155631 A is configured to limit the driving force applied to the vehicle in response to the detection of the driver's mistaken press-down operation. With this driving assist apparatus, the vehicle is prevented from starting to move suddenly. Hereinafter, the driving force applied to the vehicle will be referred to as "the vehicle driving force".

When the vehicle driving force is limited as described above, and there is an obstacle such as a raised portion of the ground and an object which obstructs a vehicle movement in front of the vehicle, the vehicle cannot move, passing the obstacle and a problem may arise in the vehicle movement. For example, when the driver intentionally presses down the acceleration pedal deeply for passing the raised portion of the ground, it may be determined that the mistaken press-down operation is performed. If it is determined that the driver presses down the acceleration pedal mistakenly, and the vehicle driving force is limited, the vehicle may not move, passing the raised portion of the ground. Hereinafter, the obstacle such as the raised portion of the ground and the object which obstructs the vehicle movement, will be referred to as "the external obstacle against vehicle movement", and the raised portion of the ground will be referred to as "the raised ground portion".

The driving assist apparatus proposed in JP 2013-155631 A changes a limitation level to the vehicle driving force from the present limitation level (hereinafter, will be referred to as "the first limitation level) to a second limitation level smaller than the first limitation level when the driving assist apparatus detects the external obstacle against vehicle movement. Thereby, the driver can increase the vehicle driving force.

In this regard, when the limitation on the vehicle driving force is changed from the first limitation to the second limitation, the vehicle may not move, passing the raised ground portion, or the vehicle may move, passing the raised ground portion roughly to cause the driver to feel uneasy.

SUMMARY

The invention has been made for solving the above-mentioned problems. An object of the invention is to provide a vehicle driving force control apparatus which limits the vehicle driving force in response to the detection of the driver's mistaken press-down operation of the acceleration pedal so as to cause the vehicle to pass the external obstacle against vehicle movement such as the raised ground portion appropriately, not to cause the driver to feel uneasy.

The vehicle driving force control apparatus according to the invention is applied to a vehicle comprising an acceleration pedal (22a) and a vehicle driving apparatus (30) which generates driving force for moving a vehicle.

The vehicle driving force control apparatus according to the invention comprises a sensor (22) and an electronic control unit (10). The sensor (22) detects an amount of an operation of the acceleration pedal (22a) as an acceleration pedal operation amount (ACP). The electronic control unit (10) controls the driving force generated by the vehicle driving force apparatus (30).

The electronic control unit (10) is configured to execute a mistaken press-down driving force control for setting one of an upper limit (Nlim) and a target value (N*) of the driving force generated by the vehicle driving apparatus (30) as an initial upper limit (Nlim0) and limiting the generated driving force to the initial upper limit (Nlim0) when the electronic control unit (10) detects a mistaken press-down operation that a driver of the vehicle presses down the acceleration pedal (22a) mistakenly on the basis of a predetermined mistaken press-down determination condition.

In addition, the electronic control unit (10) is configured to execute a limitation level reduction control when the electronic control unit (10) does not detect a predetermined movement of the vehicle while the electronic control unit (10) executes the mistaken press-down driving force control, and the acceleration pedal (22a) is operated.

The electronic control unit (10) is configured to execute the limitation level reduction control by repeatedly executing an upper limit change process for executing a first process for setting a first upper limit to a value larger than the initial upper limit (Nlim0) and limiting the generated driving force to the first upper limit for a first period of time (Tc) and then, a second process for setting a second upper limit to a value smaller than the first upper limit and equal to or larger than the initial upper limit (Nlim0) and limiting the generated driving force to the second upper limit for a second period of time (tc), and increasing the first upper limit as the number of executing the upper limit change process increases.

According to the invention, the vehicle driving force control apparatus controls the driving force generated by the vehicle driving apparatus, depending on the acceleration pedal operation amount. When the driver intends to press down the brake pedal, but the driver mistakenly presses down the acceleration pedal, the vehicle may start to move undesirably suddenly. Accordingly, the vehicle driving force control apparatus according to the invention detects a mistaken press-down operation that the driver mistakenly presses down the acceleration pedal. When the vehicle driving force control apparatus detects the mistaken press-down operation, the vehicle driving control apparatus executes the mistaken press-down driving force control for limiting the generated vehicle driving force. In particular, the vehicle driving force control apparatus executes the mistaken press-down driving force control for decreasing the generated vehicle driving force, compared with when the vehicle driving control apparatus does not detect the mistaken press-down operation.

When the generated vehicle driving force is limited, the vehicle may not pass the external obstacle against vehicle movement such as the raised ground portion. According to the invention, the vehicle driving force control apparatus determines whether to detect the predetermined movement of the vehicle while executing the mistaken press-down driving force control, and the acceleration pedal is operated. When the vehicle driving force control apparatus does not detect the predetermined movement of the vehicle, the vehicle may not pass the external obstacle against vehicle movement. Accordingly, the vehicle driving force control apparatus executes the limitation level reduction control for reducing a level of limiting the generated vehicle driving force when the vehicle driving force control apparatus does not detect the predetermined movement of the vehicle. Hereinafter, the level of limiting the generated vehicle driving force will be referred to as "the driving force limitation level".

In particular, the vehicle driving force control apparatus repeatedly executes the upper limit change process for executing the first process for setting the first upper limit to the value larger than the initial upper limit and limiting the generated driving force to the first upper limit for the first period of time and then, the second process for setting the second upper limit to the value smaller than the first upper limit and equal to or larger than the initial upper limit and limiting the generated upper limit to the second upper limit for the second period of time. Thus, the first process and the second process are executed alternately. Thereby, the driving force limitation level alternates between a small level and a large level. In addition, the vehicle driving force control apparatus increases the first upper limit as the number of executing the upper limit change process increases.

Therefore, the driving force limitation level alternates between the small level and the large level and thus, the driving force limitation level reduces gradually as a whole. While the upper limit change process is executed repeatedly, the generated vehicle driving force overcomes the external obstacle against vehicle movement and thus, the vehicle passes the external obstacle against vehicle movement. Therefore, with the invention, the driving force necessary for the vehicle to pass the external obstacle against vehicle movement, is generated by the vehicle driving apparatus. Thus, the vehicle can pass the external obstacle against vehicle movement such as the raised ground portion appropriately without being accelerated quickly. Thereby, the vehicle can be prevented from being accelerated suddenly immediately after the vehicle passes the external obstacle against vehicle movement and thus, the driver can be prevented from feeling discomfort.

According to an aspect of the invention, the electronic control unit (10) may be configured to terminate the limitation level reduction control when the acceleration pedal operation amount (ACP) decreases while the electronic control unit (10) executes the limitation level reduction control.

When the acceleration pedal operation amount decreases, the driver does not request the large driving force. Thus, there is no need to reduce the driving force limitation level. With this aspect of the invention, when the acceleration pedal operation amount decreases, the limitation level reduction control is terminated. Thereby, the limitation level reduction control is terminated at an appropriate timing. Therefore, it can be ensured that the vehicle passes the external obstacle against vehicle movement such as the raised ground portion appropriately without being accelerated quickly.

In this regard, the vehicle driving force control apparatus may be configured to terminate the limitation level reduction control when the acceleration pedal operation amount decreases by a base decrease amount or more, or when the acceleration pedal operation amount decreases to a base operation amount or less, or when the acceleration pedal operation amount decreases at a base rate or more.

According to another aspect of the invention, the electronic control unit (10) may be configured to terminate the limitation level reduction control when the first upper limit reaches a maximum upper limit (Nlimend) while the electronic control unit (10) executes the limitation level reduction control.

With this aspect of the invention, the limitation level reduction control can be terminated at the appropriate timing.

According to further another aspect of the invention, the electronic control unit (10) may be configured to set the maximum upper limit (Nlimend) to a value increasing as the acceleration pedal operation amount (ACP) increases.

The driving force requested by the driver is large as the external obstacle against vehicle movement is large, for example, an unevenness of the raised ground portion is large. With this aspect of the invention, the maximum upper limit is set to the value increasing as the acceleration pedal operation amount increases. Thus, it can be ensured that the limitation level reduction control is terminated at the appropriate timing.

According to further another aspect of the invention, the vehicle driving force apparatus may further comprise an operation device (21) operated by the driver to request the electronic control unit (10) to terminate the mistaken press-down driving force control and the limitation level reduction control. In this case, the electronic control unit (10) may be configured to induce the driver to operate the operation device (21) to request the electronic control unit (10) to terminate the mistaken press-down driving force control and the limitation level reduction control when the first upper limit (Nlim) reaches the maximum upper limit (Nlimend).

The vehicle may not pass the external obstacle against vehicle movement even when the driving force limitation level is reduced. In this case, it is preferred to terminate the mistaken press-down driving force control and the limitation level reduction control. With this aspect of the invention, there is provided the operation switch operated by the driver to request to terminate the mistaken press-down driving force control and the limitation level reduction control. Therefore, the driver can terminate the mistaken press-down driving force control and the limitation level reduction control by operating the operation device.

In addition, with this aspect of the invention, the driver is induced to operate the operation device to request to terminate the mistaken press-down driving force control and the limitation level reduction control when the first upper limit reaches the maximum upper limit. That is, the driver is induced to operate the operation device to request to terminate the mistaken press-down driving force control and the limitation level reduction control when the vehicle cannot pass the external obstacle against vehicle movement even by reducing the driving force limitation level. Thereby, the driver can terminate the mistaken press-down driving force control and the limitation level reduction control voluntarily. As a result, the large external obstacle against vehicle movement can be addressed.

According to further another aspect of the invention, the electronic control unit (10) may be configured to determine that the predetermined movement of the vehicle is not detected when the acceleration pedal operation amount (ACP) is equal to or larger than a predetermined base amount (ACPa), or the generated driving force (N) is equal to or larger than a predetermined base force, and a movement speed (V) of the vehicle is equal to or smaller than a predetermined base speed (Va) for a predetermined base period of time (Ta) or more while the electronic control unit

(10) executes the mistaken press-down driving force control, and the acceleration pedal (22a) is operated.

With this aspect of the invention, it can be appropriately determined whether the vehicle movement is blocked due to the external obstacle against vehicle movement.

According to further another aspect of the invention, the electronic control unit (10) may be configured to set the first upper limit to a value acquired by adding a predetermined upper limit addition amount to the initial upper limit (Nlim0) in the first-executed first process after the electronic control unit (10) starts to execute the limitation level reduction control.

In this case, the electronic control unit (10) may be configured to set the first upper limit to a value acquired by adding the predetermined upper limit addition amount to the lastly-set second upper limit in the first process subsequent to the first-executed first process.

Further, in this case, the electronic control unit (10) may be configured to set the predetermined upper limit addition amount to a value depending on the number of executing the upper limit change process.

With this aspect of the invention, the first upper limit is set to the value acquired by adding the predetermined upper limit addition amount to the initial upper limit in the first-executed first process after the limitation level reduction control starts to be executed. Then, the first upper limit is set to the value acquired by adding the predetermined upper limit addition amount to the lastly-set second upper limit in the first process subsequent to the first-executed first process. In addition, the predetermined upper limit addition amount is set to the value depending on the number of executing the upper limit change process. Thereby, it can be ensured that the driving force limitation level is set appropriately. Therefore, the driving force limitation level can be reduced appropriately, and it can be ensured that the vehicle passes the external obstacle against vehicle movement appropriately.

According to further another aspect of the invention, the electronic control unit (10) may be configured to set the predetermined upper limit addition amount used in the first-executed first process, to an amount larger than the predetermined upper limit addition amount used in the first process subsequent to the first-executed first process.

With this aspect of the invention, when the predetermined upper limit addition amount used in the first-executed first process, is set to the amount larger than the predetermined upper limit addition amount used in the first process subsequent to the first-executed first process. Therefore, a capability of the vehicle to pass the external obstacle against vehicle movement, for example, a capability of the vehicle to pass the raised ground portion promptly, can be improved.

According to further another aspect of the invention, the electronic control unit (10) may be configured to set the second upper limit to a value smaller than the lastly-set first upper limit and equal to or larger than the initial upper limit (Nlim0).

With this aspect of the invention, the second upper limit is set to the value smaller than the lastly-set first upper limit and equal to or larger than the initial upper limit. Thereby, the driving force limitation level can be reduced appropriately.

According to further another aspect of the invention, the electronic control unit (10) may be configured to set the second upper limit to a value increasing as the number of executing the upper limit change process increases.

With this aspect of the invention, the second upper limit is increased as the number of executing the upper limit change process increases. Thereby, the driving force limitation level is reduced gradually in the second process. Therefore, it can be ensured that the vehicle passes the external obstacle against vehicle movement appropriately.

According to further another aspect of the invention, the electronic control unit (10) may be configured to set the second upper limit to the initial upper limit (Nlim0).

With this aspect of the invention, the second upper limit is set to the initial upper limit. Thereby, the driving force limitation level can be set appropriately.

According to further another aspect of the invention, the electronic control unit (10) may be configured to set the first period of time (Tc) to a time depending on the number of executing the upper limit change process.

With this aspect of the invention, the first period of time is set to the time set depending on the number of executing the upper limit change process. Therefore, the driving force limitation level can be reduced appropriately, and it can be ensured that the vehicle passes the external obstacle against vehicle movement appropriately.

According to further another aspect of the invention, the electronic control unit (10) may be configured to set the first period of time (Tc) to a time increasing as the number of executing the upper limit change process increases.

With this aspect of the invention, the first period of time increases as the number of executing the upper limit change process increases. Thereby, the driving force limitation level can be reduced as a whole gradually by alternating the driving force limitation level between the small level and the large level.

According to further another aspect of the invention, the electronic control unit (10) may be configured to set the first period of time (Tc) used in the first-executed first process after the electronic control unit (10) starts to execute the limitation level reduction control, to a time longer than the first period of time (Tc) used in the first process subsequent to the first-executed first process.

With this aspect of the invention, the first period of time used in the first-executed first process is set to the time longer than the first period of time used in the first process subsequent to the first-executed first process. Therefore, the capability of the vehicle to pass the external obstacle against vehicle movement, for example, the capability of the vehicle to pass the raised ground portion promptly, can be improved.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

A vehicle driving force control apparatus according to an embodiment of the invention will be described with reference to the drawings.

Figure 1:
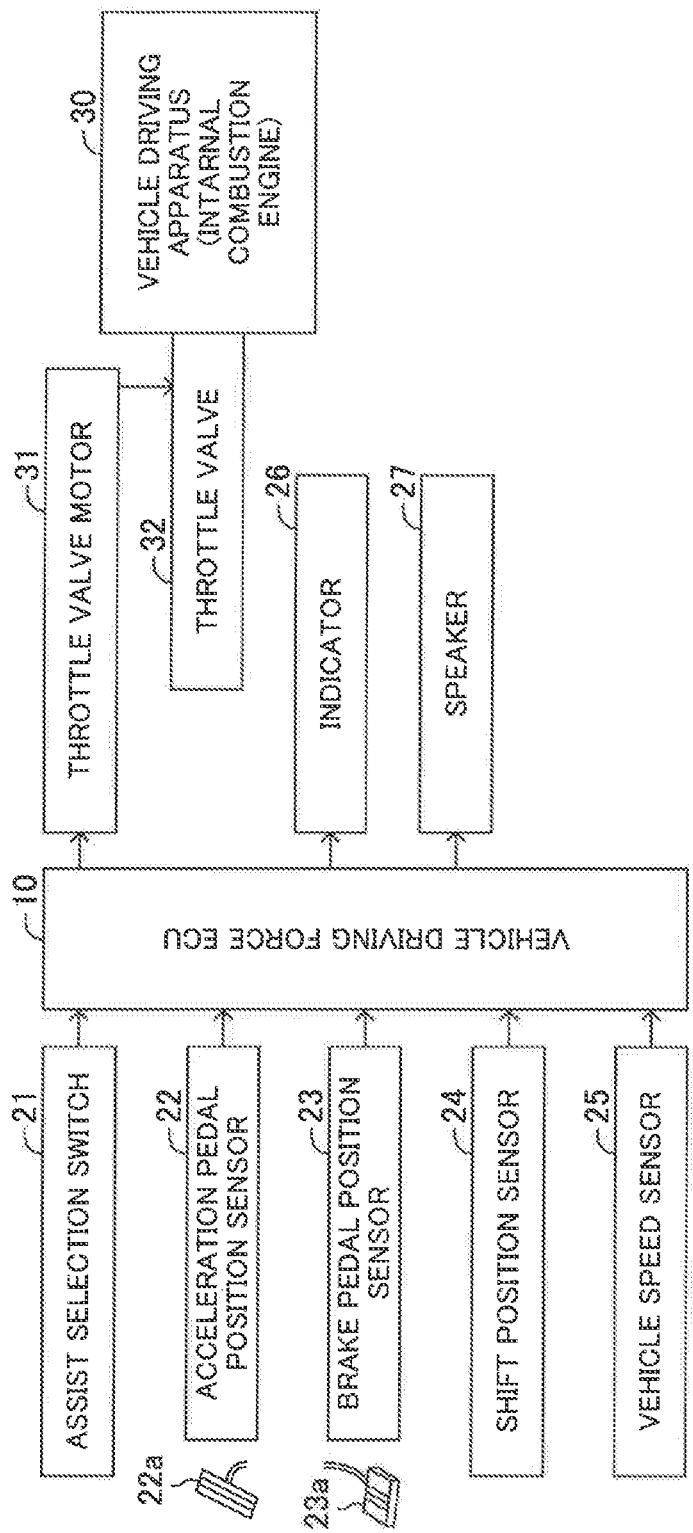
FIG. 1 is a view for showing a vehicle driving force control apparatus according to an embodiment of the invention.

The vehicle driving force control apparatus according to the embodiment of the invention is applied to a vehicle. As shown in FIG. 1, the vehicle driving force control apparatus includes a driving force ECU 10. The driving force ECU 10 is electrically connected to ECUs (not shown) via a CAN (not shown) standing for Controller Area Network so as to send and receive information to and from the ECUs. For example, the driving force ECU 10 is electrically connected to a brake ECU (not shown) for controlling a braking force and a transmission ECU (not shown) for controlling a reduction state of an automatic transmission (not shown). The ECU is an electronic control unit including a microcomputer as a main component. In this embodiment, the microcomputer includes a CPU, a ROM, a RAM, a non-volatile memory, an interface, etc. The CPU realizes various functions by executing instructions, programs, routines, etc. stored in the ROM.

The vehicle, to which the vehicle driving force control apparatus according to the embodiment is applied, can creep even when a driver of the vehicle does not press down an acceleration pedal 22a.

An assist selection switch 21, an acceleration pedal position sensor 22, a brake pedal position sensor 23, a shift position sensor 24, a vehicle speed sensor 25, an indicator 26, a speaker 27, and a throttle valve motor 31 are electrically connected to the driving force ECU 10. The sensors may be electrically connected to the ECUs other than the driving force ECU 10. In this case, the driving force ECU 10 receives detection signals of the sensors from the other ECUs via the CAN.

The assist selection switch 21 is operated by the driver of the vehicle to select whether to permit or forbid the vehicle driving force control apparatus to execute a mistaken press-down driving force control described later. When the driver turns on the assist selection switch 21, a permission mode of permitting the vehicle driving force control apparatus to execute the mistaken press-down driving force control, is selected. On the other hand, when the driver turns off the assist selection switch 21, a forbiddance mode for forbidding the vehicle driving force control apparatus to execute the mistaken press-down driving force control, is selected. When the driver selects one of the permission and forbiddance modes by operating the assist selection switch 21, the driving force ECU 10 stores the selected mode in the RAM or updates data of the mode stored in the RAM. The driving force ECU 10 determines whether to permit or forbid to execute the mistaken press-down driving force control on the basis of the selected mode.

The acceleration pedal position sensor 22 detects an amount of operating or pressing down the acceleration pedal 22a of the vehicle and outputs a signal representing the amount of operating the acceleration pedal 22a. The acceleration pedal 22a is operated by the driver to increase a driving force generated by a vehicle driving apparatus 30, in this embodiment, an internal combustion engine. Hereinafter, the amount of operating or pressing down the acceleration pedal 22a will be referred to as "the acceleration pedal operation amount ACP", and an operation of the driver to press down the acceleration pedal 22a will be referred to as "the acceleration pedal operation". The acceleration pedal operation amount ACP is zero when the driver does not perform the acceleration pedal operation, that is, the driver takes his/her foot off or releases the acceleration pedal 22a. The acceleration pedal operation amount ACP increases as the amount of operating or pressing down the acceleration pedal 22a by the driver increases.

The brake pedal position sensor 23 detects an amount of operating or pressing down a brake pedal 23a of the vehicle and outputs a signal representing the amount of operating or pressing down the brake pedal 23a. The brake pedal 23a is operated by the driver to increase the braking force generated by a braking apparatus, in this embodiment, a hydraulic-operated friction braking apparatus (not shown) of the vehicle. Hereinafter, the amount of operating or pressing down the brake pedal 23a will be referred to as "the brake pedal operation amount", and an operation of the driver to press down the brake pedal 23a will be referred to as "the brake pedal operation". The brake pedal operation amount is zero when the driver does not perform the brake pedal press-down operation (i.e., a braking operation), that is, the driver releases or takes his/her foot off the brake pedal 23a. The brake pedal operation amount increases as the amount of operating or pressing down the brake pedal 23a by the driver increases. The brake ECU (not shown) controls an activation of the friction braking apparatus (not shown) on the basis of the brake pedal operation amount. In this embodiment, the brake pedal position sensor 23 is used for determining whether the brake pedal press-down operation is performed or not. A brake switch may be used in place of the brake pedal position sensor 23. The brake switch outputs an ON signal when the brake pedal press-down operation is performed. The brake switch outputs an OFF signal when the brake pedal press-down operation is not performed.

The shift position sensor 24 detects a position of a shift lever (not shown) operated by the driver and outputs a signal representing the detected position of the shift lever. Hereinafter, the position of the shift lever will be referred to as "the shift position". The shift position includes a position corresponding to a parking range P, a position corresponding to a forward movement range D, a position corresponding to a rearward movement range R or a reverse position R, a position corresponding to a neutral range N, etc. The transmission ECU (not shown) determines a target gear position of the transmission on the basis of the shift position, the acceleration pedal operation amount ACP, and a movement speed of the vehicle and controls activations of transmission actuators (not shown) to realize the target gear position. Hereinafter, the movement speed of the vehicle will be referred to as "the vehicle speed V".

The vehicle speed sensor 25 outputs a signal representing the vehicle speed V. Alternatively, the driving force ECU 10 may be configured to calculate the vehicle speed V by using vehicle wheel rotation speed sensors (not shown) for detecting rotation speeds of four vehicle wheels. The vehicle wheel rotation speed sensors output signals representing the rotation speeds of the vehicle wheels, respectively. The driving force ECU 10 receives the signals output from the vehicle wheel rotation speed sensors and calculates the vehicle speed V on the basis of the rotation speeds of the vehicle wheels represented by the received signals.

The indicator 26 is a head-up display which receives a display signal from the driving force ECU 10 and indicates a display information represented by the display signal at an indication area of a front window of the vehicle. The indicator 26 is not limited to the head-up display. The indicator 26 may be an indicator provided on an instrument panel of the vehicle, etc.

The speaker 27 generates an alert sound such as a buzzer sound when the speaker 27 receives an output signal which is a command for generating the alert sound from the driving force ECU 10.

The throttle valve motor 31 receives a valve adjustment signal from the driving force ECU 10 and adjusts an opening degree of a throttle valve 32 of the vehicle driving apparatus 30 such as the internal combustion engine on the basis of the received valve adjustment signal. The valve adjustment signal includes a target opening degree of the throttle valve 32. The target opening degree is set such that the target opening degree increases as a driver-requested vehicle driving force corresponding to the acceleration pedal operation amount APC, increases.

The throttle valve motor 31 rotates the throttle valve 32 to control the opening degree of the throttle valve 32 to the target opening degree represented by the valve adjustment signal. The opening degree of the throttle valve 32 increases as the target opening degree increases. Thus, an amount of an air suctioned into the vehicle driving apparatus 30 (i.e., an intake air amount) increases as the target opening degree increases. Thus, the vehicle driving force generated by the vehicle driving apparatus 30 increases as the acceleration pedal operation amount ACP increases. The driving force ECU 10 corresponds to vehicle driving force control means of the invention.

The driving force ECU 10 is electrically connected to various sensors such as a throttle valve opening degree sensor (not shown), etc. for outputting signals representing controlled states of the vehicle driving apparatus 30, respectively. The driving force ECU 10 may detect or estimate the controlled states of the vehicle driving apparatus 30 such as an actual vehicle driving force N output by the vehicle driving apparatus 30.

Mistaken Press-Down Driving Force Control

Next, a summary of the mistaken press-down driving force control will be described. Hereinafter, a mistaken press-down operation of the acceleration pedal 22a by the driver will be simply referred to as "the mistaken press-down operation". When the mistaken press-down operation is performed, the vehicle moves contrary to a driver's intention. For example, when the mistaken press-down operation is performed, the vehicle starts to move suddenly contrary to the driver's intention.

Accordingly, the driving force ECU 10 estimates whether the driver performs the mistaken press-down operation. When the mistaken press-down operation is detected (in particular, the driving force ECU 10 estimates that the driver performs the mistaken press-down operation), the driving force ECU 10 decreases the vehicle driving force generated by the vehicle driving apparatus 30 to a force smaller than a normal vehicle driving force. The normal vehicle driving force corresponds to the vehicle driving force generated by the vehicle driving apparatus 30 when the mistaken press-down operation is not detected. Thereby, the vehicle is prevented from moving contrary to the driver's intention. The mistaken press-down driving force control is a control for decreasing the vehicle driving force generated by the vehicle driving apparatus 30 to the force smaller than the normal vehicle driving force. In this embodiment, the mistaken press-down driving force control is executed when the vehicle moves rearwardly, that is, the shift lever position is set at the rearward movement range R.

A process of estimating whether the mistaken press-down operation is performed when the driver moves the vehicle rearwardly, will be described.

When the driver intends to start to move the parked vehicle forwardly, the driver changes the shift lever position from the position corresponding to the parking range P to the position corresponding to the forward movement range D with pressing down the brake pedal 23a. Then, the driver presses down the acceleration pedal 22a relatively fast to the relatively large extent.

When the driver intends to start to move the parked vehicle rearwardly, the driver changes the shift lever position from the position corresponding to the parking range P to the position corresponding to the rearward movement range R with pressing down the brake pedal 23a. At this time, in general, the driver moves the vehicle gradually rearwardly by operating the brake pedal 23a. In particular, the driver creeps the vehicle rearwardly by operating the brake pedal 23a. Alternatively, the driver moves the vehicle rearwardly by releasing the brake pedal 23a and then, pressing down the acceleration pedal 22a slightly. In other words, the driver does not press down the acceleration pedal 22a relatively fast to the relatively large extent when the driver intends to move the vehicle rearwardly. Thus, a fast press-down operation of the acceleration pedal 22a to the relatively large extent is likely to be performed mistakenly when the driver intends to move the vehicle rearwardly. Further, the acceleration pedal 22a is not pressed down within a relatively short time from a shift position change time when the shift lever position is changed to the position corresponding to the rearward movement range R. Thus, when the acceleration pedal 22a is pressed down immediately after the shift position change time, a press-down operation of the acceleration pedal 22a is likely to be performed mistakenly.

Accordingly, the driving force ECU 10 determines that the mistaken press-down operation is performed when the shift lever position corresponds to the position corresponding to the rearward movement range R, the acceleration pedal operation amount ACP is equal to or larger than a mistaken press-down determination operation amount ACPs, and an acceleration pedal operation speed ACV is equal to or larger than a mistaken press-down determination operation speed ACVs. In other words, the driving force ECU 10 determines that the mistaken press-down operation is performed when the shift lever position is the rearward movement range R, and the driving force ECU 10 detects an operation of pressing down the acceleration pedal 22a for starting to move the vehicle suddenly.

Alternatively, in place of the above-described method for determining whether the mistaken press-down operation is performed, the driving force ECU 10 may be configured to determine that the mistaken press-down operation is performed when an acceleration pedal operation time ACT is equal to or shorter than a mistaken press-down determination time ACTs. The acceleration pedal operation time ACT is a time elapsing until the acceleration pedal press-down operation starts from the shift position change time when the shift lever position is changed to the position corresponding to the rearward movement range R.

Alternatively, the driving force ECU 10 may be configured to determine whether the mistaken press-down operation is performed by a combination of the above-described two methods for determining whether the mistaken press-down operation is performed. In particular, the driving force ECU 10 may be configured to determine that the mistaken press-down operation is performed when the acceleration pedal operation amount ACP is equal to or larger than the mistaken press-down determination operation amount ACPs, and the acceleration pedal operation speed ACV is equal to or larger than the mistaken press-down determination operation speed ACVs until the mistaken press-down determination time ACTs elapses from the shift position change time when the shift lever position is changed to the position corresponding to the rearward movement range R.

When the mistaken press-down operation is detected, the vehicle driving force generated by the vehicle driving apparatus 30 is decreased, compared to when the mistaken press-down operation is not detected. At a normal time when the driving force ECU 10 does not detect the mistaken press-down operation, the driving force ECU 10 sets a driver request vehicle driving force depending on the acceleration pedal operation amount ACP as a target vehicle driving force and controls the opening degree of the throttle valve 32 such that the vehicle driving force generated by the vehicle driving apparatus 30 reaches the driver request vehicle driving force. On the other hand, when the driving force ECU 10 detects the mistaken press-down operation, the driving force ECU 10 sets an upper limit of the vehicle driving force to the vehicle driving force smaller than the driver request vehicle driving force and controls the opening degree of the throttle valve 32 such that the vehicle driving force generated by the vehicle driving apparatus 30 does not exceed the upper limit of the vehicle driving force. In particular, the driving force ECU 10 increases the opening degree of the throttle valve 32 such that the vehicle driving force generated by the vehicle driving apparatus 30 increases toward the driver request vehicle driving force and then, when the actual vehicle driving force N reaches the upper limit of the vehicle driving force, controls the opening degree of the throttle valve 32 such that the actual vehicle driving force N is maintained at the upper limit of the vehicle driving force.

Therefore, when the mistaken press-down operation is detected, the vehicle driving force generated by the vehicle driving apparatus 30 is limited to the small vehicle driving force by a process of limiting the vehicle driving force to the upper limit, compared to a normal situation. Thereby, the vehicle may be prevented from moving undesirably. In particular, the vehicle may be prevented from starting to move rearwardly suddenly. The process of limiting the vehicle driving force to the upper limit may be performed at the normal situation. In this regard, when the mistaken press-down operation is detected, the upper limit is set to a value smaller than the upper limit set at the normal situation. A control for setting the upper limit of the vehicle driving force to the value smaller than the upper limit set at the normal situation, will be referred to as "the driving force limitation control", and the upper limit of the vehicle driving force will be referred to as "the driving force upper limit".

When there is a raised portion of the ground or a raised portion of a road behind tires of the vehicle in moving the vehicle rearward, and the mistaken press-down driving force control is executed, the vehicle driving force is decreased and thus, the vehicle may not pass the raised portion of the ground. Accordingly, the driving force ECU 10 executes a control for reducing a level of limiting the vehicle driving force gradually when the vehicle cannot move continuously, that is, the vehicle speed V is maintained at zero continuously although the vehicle driving apparatus 30 generates the vehicle driving force. Hereinafter, the control for reducing the level of limiting the vehicle driving force gradually will be referred to as "the limitation level reduction control", the level of limiting the vehicle driving force will be referred to as "the driving force limitation level", and the raised portion of the ground will be referred to as "the raised ground portion".

During the limitation level reduction control, the driving force ECU 10 changes a reduction level state between a large reduction level state and a small reduction level state alternately. The reduction level state is a state of a level of reducing the driving force limitation level. The large reduction level state is a state that the level of reducing the driving force limitation level is large. The small reduction level state is a state that the level of reducing the driving force limitation level is small. In addition, during the limitation level reduction control, the driving force ECU 10 increases the level of reducing the driving force limitation level entirely as the number of changing the reduction level state increases. The driving force ECU 10 increases the driving force upper limit Nlim to reduce the driving force limitation level. Therefore, an amount of increasing the driving force upper limit Nlim is set to an amount increasing as the level of reducing the driving force limitation level increases. In other words, the amount of increasing the driving force upper limit Nlim is set to the amount decreasing as the level of reducing the driving force limitation level decreases.

The driving force ECU 10 repeatedly determines whether the driver releases the acceleration pedal 22a, i.e., the acceleration pedal operation amount ACP decreases while the driving force ECU 10 executes the limitation level reduction control. When the driving force ECU 10 detects that the driver releases the acceleration pedal 22a, the driving force ECU 10 terminates the limitation level reduction control and starts the driving force limitation control.

The vehicle can pass the raised ground portion by controlling the vehicle driving force as described above. In addition, the vehicle can be prevented from being accelerated at a large acceleration rate immediately after the vehicle passes the raised ground portion.

When the actual vehicle driving force N or the driving force upper limit Nlim increased by the limitation level reduction control reaches a limitation level reduction end threshold, the driving force ECU 10 indicates a display for inducing the driver to turn off the assist selection switch 21, terminates the limitation level reduction control, and starts the driving force limitation control. When the driver turns off the assist selection switch 21, the driving force ECU 10 terminates the driving force imitation control.

Driving Force Control Routine

Figure 2:
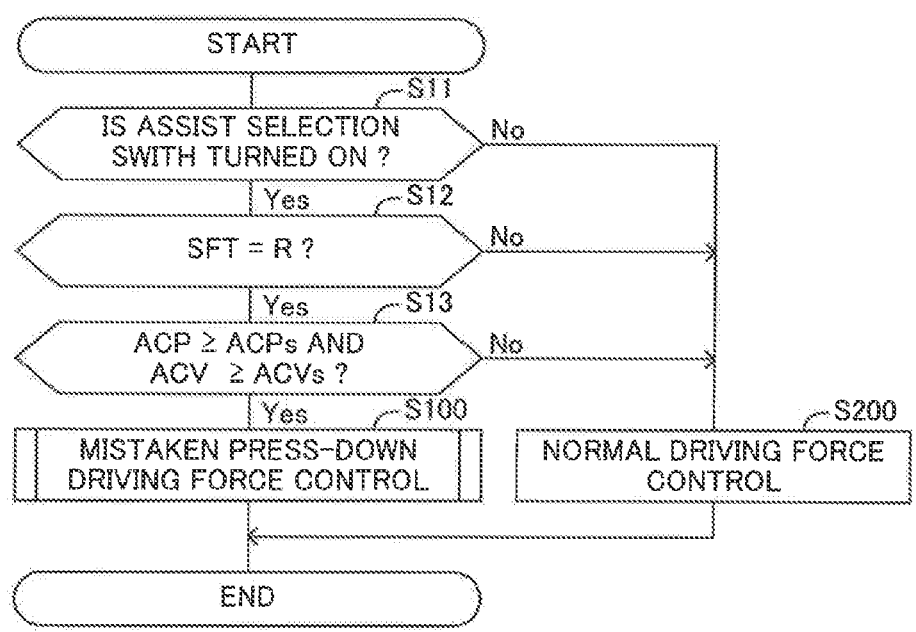
FIG. 2 is a view for showing a flowchart of a vehicle driving force control routine.
Figure 3:
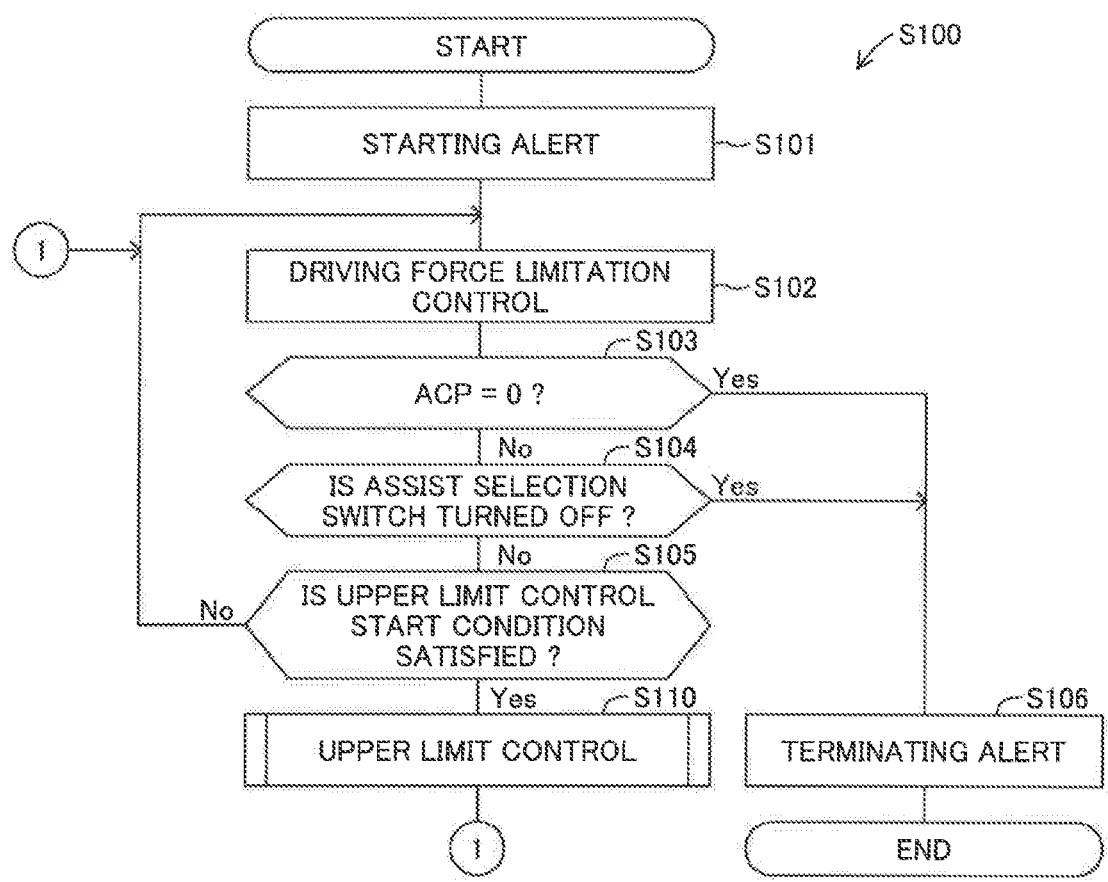
FIG. 3 is a view for showing a flowchart of a mistaken press-down driving force control routine (a sub-routine).
Figure 4:
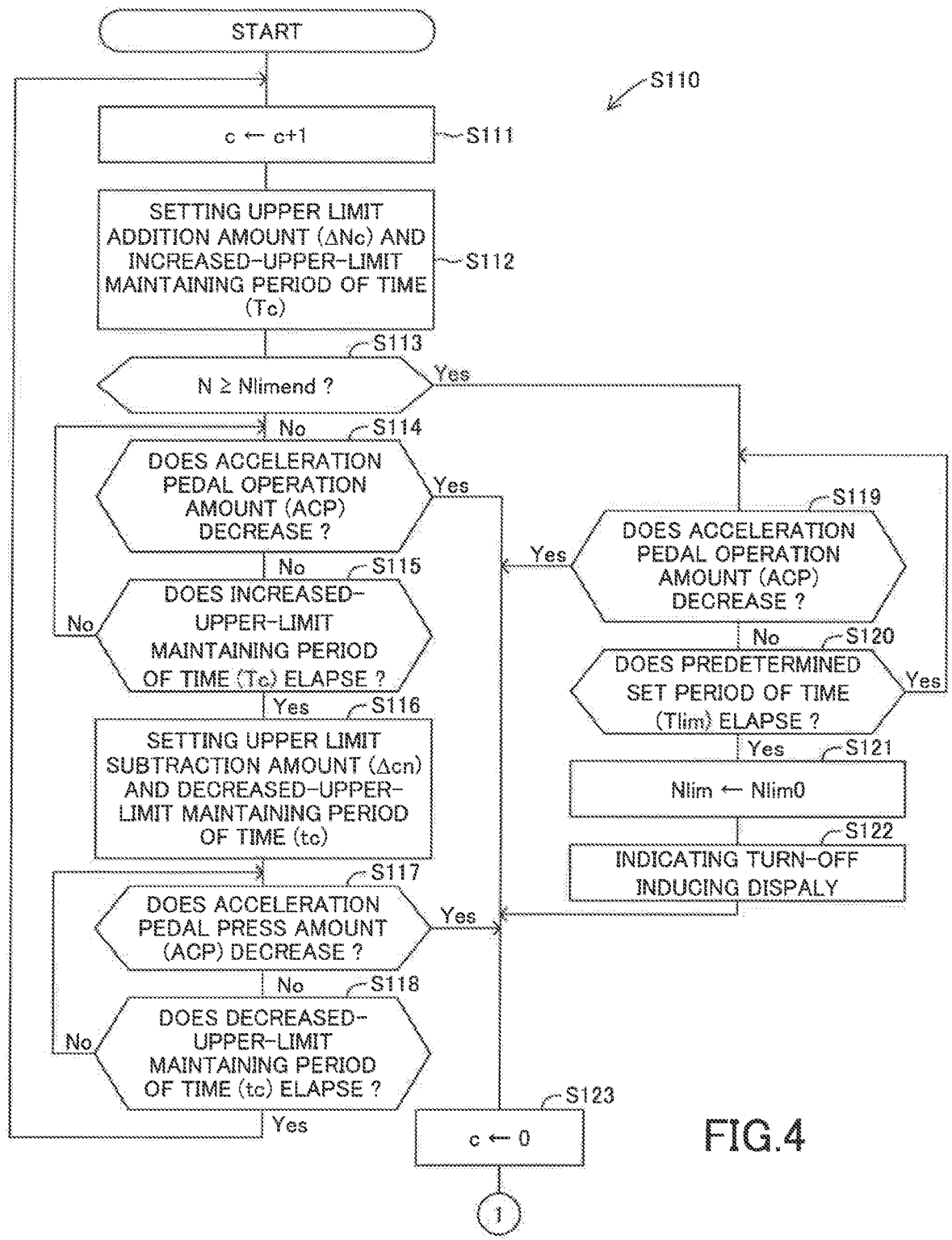
FIG. 4 is a view for showing a flowchart of a limitation level reduction control routine (a sub-routine).

Next, processes executed by the driving force ECU 10 will be described with reference to flowcharts. FIG. 2 shows a flowchart of a driving force control routine executed by the driving force ECU 10. FIG. 3 shows a flowchart of a mistaken press-down driving force control routine as a sub-routine included in the driving force control routine. FIG. 4 shows a flowchart of a limitation level reduction control routine as a sub-routine included in the mistaken press-down driving force control routine.

The driving force ECU 10 is configured or programmed to execute the driving force control routine shown in FIG. 2 with a predetermined calculation period. In this regard, when the driving force ECU 10 starts to execute the mistaken press-down driving force control at a step S100, the driving force ECU 10 is configured or programmed to start the driving force control routine shown in FIG. 2 from a process of a step S11 after the driving force ECU 10 finishes the mistaken press-down driving force control at the step S100.

When the driving force ECU 10 starts the driving force control routine, the driving force ECU 10 proceeds with the process to the step S11 to determine whether an execution of the mistaken press-down driving force control is permitted by the driver operating the assist selection switch 21. When the execution of mistaken press-down driving force control is not permitted (S11: No), the driving force ECU 10 proceeds with the process to a step S200. The driving force ECU 10 executes a normal driving force control at the step S200. The normal driving force control is a driving force control executed when the mistaken press-down driving force control is not executed. The normal driving force control is a control for setting the driver request vehicle driving force depending on the acceleration pedal operation amount ACP, in particular, in proportion to the acceleration pedal operation amount ACP and adjusting the opening degree of the throttle valve 32 such that the actual vehicle driving force N generated by the vehicle driving force apparatus 30 reaches the driver request vehicle driving force.

When the execution of the mistaken press-down driving force control is permitted by the driver operating the assist selection switch 21 (S11: Yes), the driving force ECU 10 proceeds with the process to a step S12 to read the shift position SFT represented by the detection signal of the shift position sensor 24 and determine whether the shift position SFT is the position corresponding to the rearward movement range R. When the shift position SFT is not the position corresponding to the rearward movement range R (S12: No), the driving force ECU 10 proceeds with the process to the step S200. On the other hand, when the shift position SFT is the position corresponding to the rearward movement range R, the driving force ECU 10 proceeds with the process to a step S13 to determine whether a mistaken press-down determination condition is satisfied.

In particular, the driving force ECU 10 reads the acceleration pedal operation amount ACP from the acceleration pedal position sensor 22 and determines whether the acceleration pedal operation amount ACP is equal to or larger than the mistaken press-down determination operation amount ACPs, and the acceleration pedal operation speed ACV is equal to or larger than the mistaken press-down determination operation speed ACVs. While the driving force ECU 10 executes the driving force control routine, the driving force ECU 10 reads the acceleration pedal operation amount ACP with a predetermined short period and calculates the acceleration pedal operation speed ACV which is an amount of a change of the acceleration pedal operation amount ACP per unit time on the basis of a temporal change of the acceleration pedal operation amount ACP within the last predetermined period.

When the shift position SFT is the position corresponding to the rearward movement range R, the acceleration pedal operation amount ACP is equal to or larger than the mistaken press-down determination operation amount ACPs, and the acceleration pedal operation speed ACV is equal to or larger than the mistaken press-down determination operation speed ACVs, it can be estimated that the driver performs the mistaken press-down operation, i.e., presses down the acceleration pedal 22a mistakenly.

When the mistaken press-down determination condition is not satisfied (S13: No), the driving force ECU 10 proceeds with the process to the step S200. Therefore, the normal driving force control is continuously executed while the driving force ECU 10 determines "No" at any of the steps S11, S12, and S13.

On the other hand, when the mistaken press-down determination condition is satisfied (S12: Yes and S13: Yes), the driving force ECU 10 proceeds with the process to the step S100 to execute the mistaken press-down driving force control. The mistaken press-down driving force control is realized by executing the mistaken press-down driving force control routine as the sub-routine shown in FIG. 3.

The driving force ECU 10 executes the driving force control routine when the brake pedal position sensor 23 does not detect the brake pedal press-down operation. For example, when both of the brake pedal press-down operation and the acceleration pedal press-down operation are detected, a control of the braking force by the brake ECU (not shown) in response to the brake pedal press-down operation, is executed. In this case, the normal driving force control and the mistaken press-down driving force control are not executed.

When the driving force ECU 10 starts to execute the mistaken press-down driving force control routine, the driving force ECU 10 starts to perform an alert to the driver at a step S101. In this case, the driving force ECU 10 sends the display signal to the indicator 26 for causing the indicator 26 to indicate the alert display for inducing the driver to release the acceleration pedal 22a. In addition, the driving force ECU 10 sends an alert sound output signal for causing the speaker 27 to output the alert sound (for example, the buzzer sound). Thereby, the driver is alerted by the buzzer sound and induced to release the acceleration pedal 22a by the alert display on the indicator 26. It should be noted that an audio guidance output from the speaker 27 to induce the driver to release the acceleration pedal 22a may be used in place of the buzzer sound.

Figure 5:
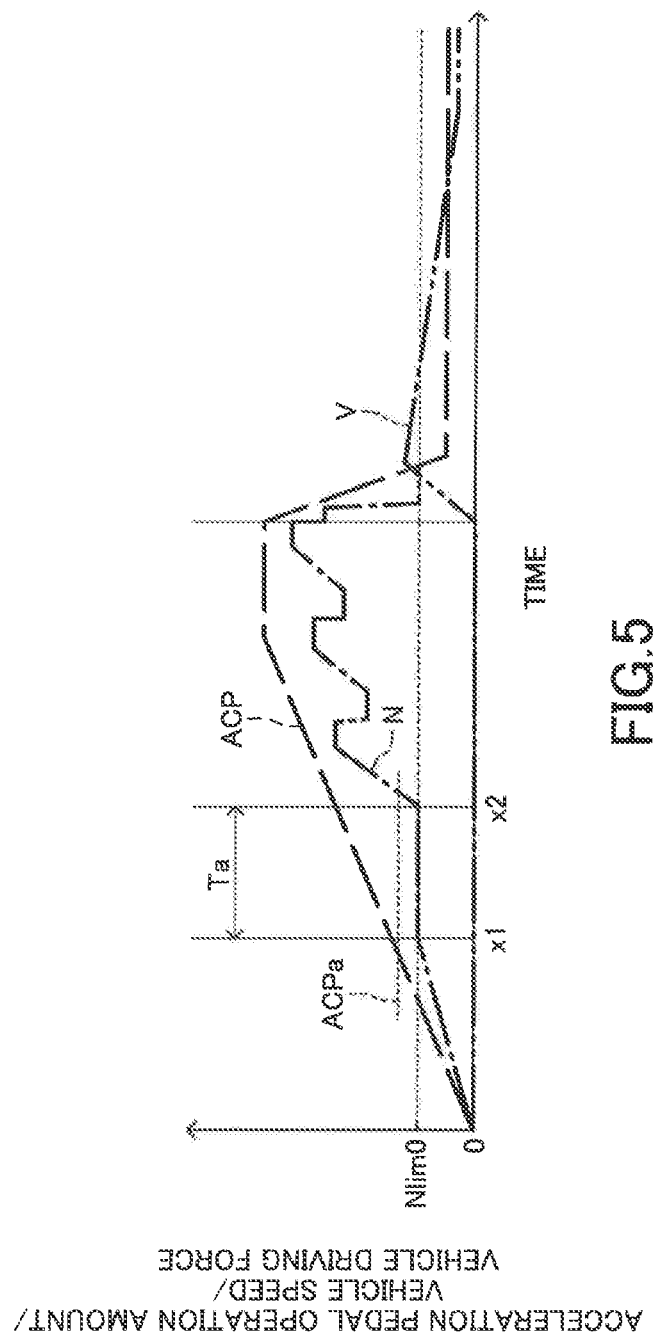
FIG. 5 is a view for showing a graph which shows a change of an acceleration pedal operation amount ACP, a change of an actual vehicle driving force N, and a change of a vehicle speed V.

Next, the driving force ECU 10 starts to execute the driving force limitation control at a step S102. In this case, the driving force ECU 10 sets the driving force upper limit Nlim to the driving force upper limit Nlim0 used for addressing the mistaken press-down operation. The driving force upper limit Nlim used for addressing the mistaken press-down operation is changed as described later. Hereinafter, the driving force upper limit Nlim0 will be referred to as "the initial upper limit Nlim0". In FIG. 5, a dashed wavy line shows a change of the acceleration pedal operation amount ACP, and a chain single-dashed line shows a change of the actual vehicle driving force N output from the vehicle driving apparatus 30 when the driving force limitation control is executed. Further, a chain double-dashed line shows a change of the vehicle speed V.

When the actual vehicle driving force N reaches the initial upper limit Nlim0 at a time x1 as shown in FIG. 5 after the driving force limitation control is started, the actual vehicle driving force N is maintained at the initial upper limit Nlim0. Thereby, the vehicle driving force for moving the vehicle rearwardly is limited.

The acceleration pedal operation amount ACP corresponds to the driver request vehicle driving force. Thus, the acceleration pedal operation amount ACP shown in FIG. 5 corresponds to the driver request vehicle driving force.

Next, the driving force ECU 10 determines whether the acceleration pedal operation amount ACP is zero, i.e., the driver releases the acceleration pedal 22a at a step S103. When the acceleration pedal operation amount ACP is not zero, the driving force ECU 10 proceeds with the process to a step S104 to determine whether the assist selection switch 21 is turned off. When the assist selection switch 21 is not turned off, the driving force ECU 10 proceeds with the process to a step S105.

At the step S105, the driving force ECU 10 determines whether a limitation level reduction start condition is satisfied. The limitation level reduction start condition is a condition for reducing the driving force limitation level. The limitation level reduction start condition is set as follows.

First condition: The acceleration pedal operation amount ACP continues to be equal to or larger than a base operation amount ACPa for a base period of time Ta or more.

Second condition: The vehicle speed V continues to be equal to or smaller than a base speed Va for the base period of time Ta or more even when the actual vehicle driving force N corresponds to the initial upper limit Nlim0.

The limitation level reduction start condition is satisfied when both of the first and second conditions are satisfied. The base period of time Ta and the base operation amount ACPa are set previously. The base speed Va is previously set to a small value, at which the vehicle can be considered to stop. The base period of time Ta used for the first condition and the base period of time Ta used for the second condition may be different from each other.

For example, in FIG. 5, the vehicle speed V is maintained at zero (V≤Va) until the base period of time Ta elapses from the time x1 when the actual vehicle driving force N reaches the initial upper limit Nlim0. In addition, the acceleration pedal operation amount ACP is maintained at a value equal to or larger than the base operation amount ACPa until the base period of time Ta elapses from the time x1. In this case, the limitation level reduction start condition is satisfied at a time x2.

A process of the step S105 is a process for determining whether there is a particular situation that the vehicle speed V depending on the acceleration pedal operation amount ACP is not detected although the acceleration pedal 22a is pressed down. That is, the process of the step S105 is a process for determining whether there is a particular situation that a predetermined vehicle movement is not detected although the acceleration pedal 22a is pressed down. The particular situation represents, for example, a situation that the vehicle cannot move rearwardly due to the raised ground portion existing behind the rear tires of the vehicle. Both of the acceleration pedal operation amount ACP and the actual vehicle driving force N may not be used for determining whether the limitation level reduction start condition is satisfied. Only one of the acceleration pedal operation amount ACP and the actual vehicle driving force N may be used for determining whether the limitation level reduction start condition is satisfied. Therefore, the limitation level reduction start condition may include one of a condition that the acceleration pedal operation amount ACP continues to be equal to or larger than the base amount ACPa, and the vehicle speed V is equal to or smaller than the base speed Va and a condition that the actual vehicle driving force N is equal to or larger than a base force, and the vehicle speed V is equal to or smaller than the base speed Va.

When the limitation level reduction start condition is not satisfied, the driving force ECU 10 returns the process to the step S102. In this case, the driving force limitation control continues to be executed.

When the driver's operation of releasing the acceleration pedal 22a is detected (S103: Yes) or the driver's operation of turning off the assist selection switch 21 is detected (S104: Yes) while the processes described above are repeated and thus, the driving force limitation control is executed, the driving force ECU 10 terminates the driving force limitation control and at a step S106, terminates the alert to the driver and then, terminates the mistaken press-down driving force control routine. When the driving force ECU 10 terminates the mistaken press-down driving force control routine, the driving force ECU 10 starts the driving force control routine shown in FIG. 2 from the step S11. In this case, the normal driving force control (S200) is started.

On the other hand, when the limitation level reduction start condition is satisfied (S105: Yes) while the driving force limitation control is executed, the driving force ECU 10 proceeds with the process to a step S110 to execute the limitation level reduction control. The limitation level reduction control is executed by executing the limitation level reduction control routine shown in FIG. 4 as the sub-routine.

When the limitation level reduction control routine is started, the driving force ECU 10 increases a counter value c by "1" at a step S111. The counter value c is initially set to "0". Therefore, when a process of the step S111 is first executed, the counter value c is set to "1". In the limitation level reduction control routine, the driving force limitation level is reduced in a step-by-step manner. The counter value c represents the level of reducing the driving force limitation level.

A process of reducing the driving force limitation level is realized by increasing the driving force upper limit Nlim applied to the vehicle driving force generated by the vehicle driving apparatus 30 from the initial upper limit Nlim0. In particular, as can be understood from processes described later, the driving force ECU 10 executes repeatedly a process including a first process and a second process. The first process is a process for maintaining the level of reducing the driving force limitation level at a large level. Hereinafter, a state that the level of reducing the driving force limitation level is maintained at the large level, will be referred to as "the reduction level large state". The second process is a process for maintaining the level of reducing the driving force limitation level at a small level smaller than the large level realized by the first process. In addition, the second process is executed after the first process is executed. Hereinafter, a state that the level of reducing the driving force limitation level is maintained at the small level, will be referred to as "the reduction level small state". Further, the process including the first and second processes will be referred to as "the upper limit change process". The counter value c set at the step S111 represents the number of executing the upper limit change process.

Next, at a step S112, the driving force ECU 10 sets an amount of increasing the driving force upper limit Nlim as an amount $\Delta Nc$ and sets a period of time for maintaining a state that the driving force upper limit Nlim is increased by the amount $\Delta Nc$ as a period of time Tc. Therefore, the driving force upper limit Nlim is increased from the present driving force upper limit Nlim by the amount $\Delta Nc$ by executing a process of the step S112. The driving force ECU 10 has stored the amounts $\Delta Nc$ and the periods of time Tc corresponding to the counter values c, respectively. Therefore, at the step S112, the amount $\Delta Nc$ and the period of time Tc corresponding to the present counter value c, are set. Hereinafter, the amount $\Delta Nc$ will be referred to as "the upper limit addition amount $\Delta Nc$", and the period of time Tc will be referred to as "the increased-upper-limit maintaining period of time Tc".

In this case, the counter value c is used in place of a character "c" of the reference symbol "$\Delta Nc$" denoting the upper limit addition amount. Also, the counter value c is used in place of the character "c" of the reference symbol "Tc" denoting the increased-upper-limit maintaining period of time. Therefore, the upper limit addition amount $\Delta Nc$ is "the upper limit addition amount $\Delta N1$" when the counter value c is "1". Also, the increased-upper-limit maintaining period of time Tc is "the increased-upper-limit maintaining period of time T1" when the counter value c is "1". When the process of the step S112 is first executed, the driving force upper limit Nlim corresponds to the initial upper limit Nlim0. Thus, a value calculated by adding the upper limit addition amount $\Delta N1$ to the initial upper limit Nlim0 is set as the driving force upper limit Nlim ($=$Nlim0$+\Delta N1$) by executing the process of the step S112.

Figure 6:
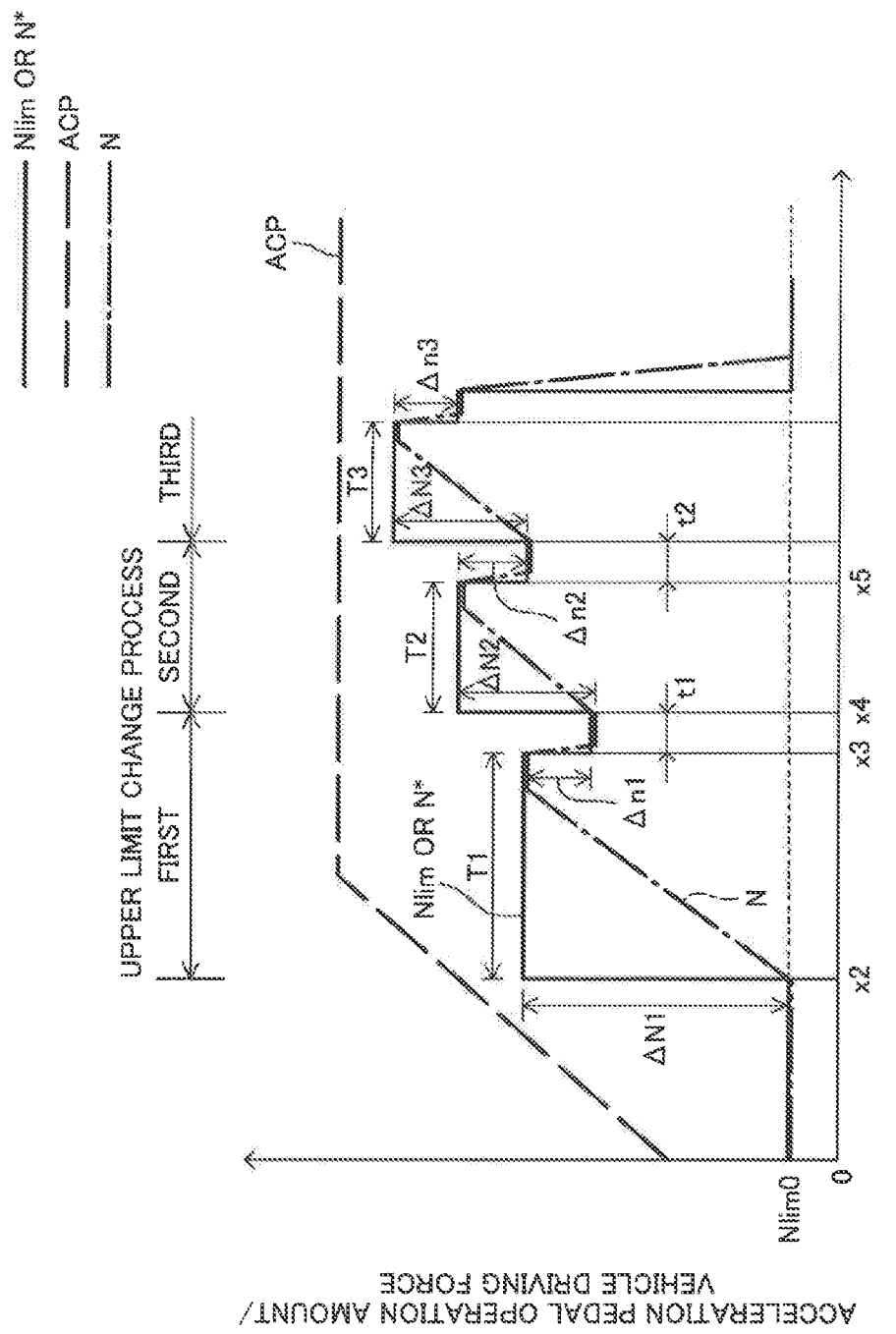
FIG. 6 is a view for showing a graph which shows the change of the acceleration pedal operation amount ACP, a change of an upper limit Nlim for limiting the vehicle driving force, and the change of the actual vehicle driving force N.

For example, as shown in FIG. 6, when the limitation level reduction control routine is started at a time x2, a value acquired by adding the upper limit addition amount $\Delta N1$ to the initial upper limit Nlim0 is set as the driving force upper limit Nlim ($=$Nlim$+\Delta N1$). Thereby, the actual vehicle driving force N increases. When the actual vehicle driving force N reaches the driving force upper limit Nlim ($=$Nlim$+\Delta N1$), the actual vehicle driving force N is maintained at the present driving force upper limit Nlim. In FIG. 6, a solid line shows the driving force upper limit Nlim and a target value N* of the vehicle driving force. The target value N* is used in a second modified example of this embodiment described later. Thus, the target value N* is not used in this embodiment.

The driving force ECU 10 determines whether the actual vehicle driving force N reaches a limitation level reduction end upper limit Nlimend at a step S113 after the driving force ECU 10 executes a process of setting the upper limit addition amount $\Delta Nc$ and the increased-upper-limit maintaining period of time Tc at the step S112. In the beginning of an execution of the limitation level reduction control routine, the actual vehicle driving force N does not reach the limitation level reduction end upper limit Nlimend. Thus, the driving force ECU 10 determines "No" at the step S113 and then, proceeds with the process to a step S114.

The limitation level reduction end upper limit Nlimend is, for example, set on the basis of the acceleration pedal operation amount ACP. In this embodiment, a value acquired by multiplying the driver request vehicle driving force corresponding to the present acceleration pedal operation amount ACP by a predetermined coefficient K ($<1$), is set as the limitation level reduction end upper limit Nlimend. For example, a value corresponding to 90% of the driver request vehicle driving force (K$=$0.9) is set as the limitation level reduction end upper limit Nlimend. Hereinafter, the limitation level reduction end upper limit Nlimend will be referred to as "the maximum upper limit Nlimend".

Figure 7:
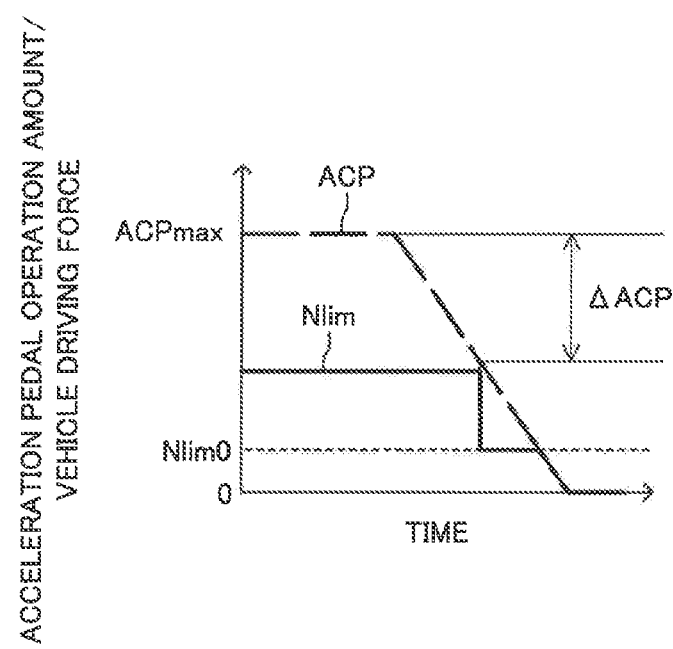
FIG. 7 is a view for showing a graph which shows the change of the acceleration pedal operation amount ACP and the change of the upper limit Nlim for limiting the vehicle driving force.

At the step S114, the driving force ECU 10 determines whether the acceleration pedal operation amount ACP decreases. This determination process of the step S114 is executed on the basis of a predetermined acceleration pedal release operation determination condition. For example, as shown in FIG. 7, the driving force ECU 10 has stored a maximum value ACPmax of the acceleration pedal operation amount ACP after the driving force ECU 10 starts the limitation level reduction control and determines whether the present acceleration pedal operation amount ACP decreases by an amount equal to or larger than a predetermined constant amount $\Delta ACP$ relative to the maximum value ACPmax. Hereinafter, a method of determining whether the present acceleration pedal operation amount ACP decreases by the amount equal to or larger than the predetermined constant amount $\Delta ACP$ relative to the maximum value ACPmax, will be referred to as "the first acceleration pedal release operation determination method". The constant amount $\Delta ACP$ is set to a value, at which the acceleration pedal release operation determination condition is satisfied before the acceleration pedal operation amount ACP becomes smaller than the acceleration pedal operation amount ACP corresponding to the initial upper limit Nlim0.

Figure 8:
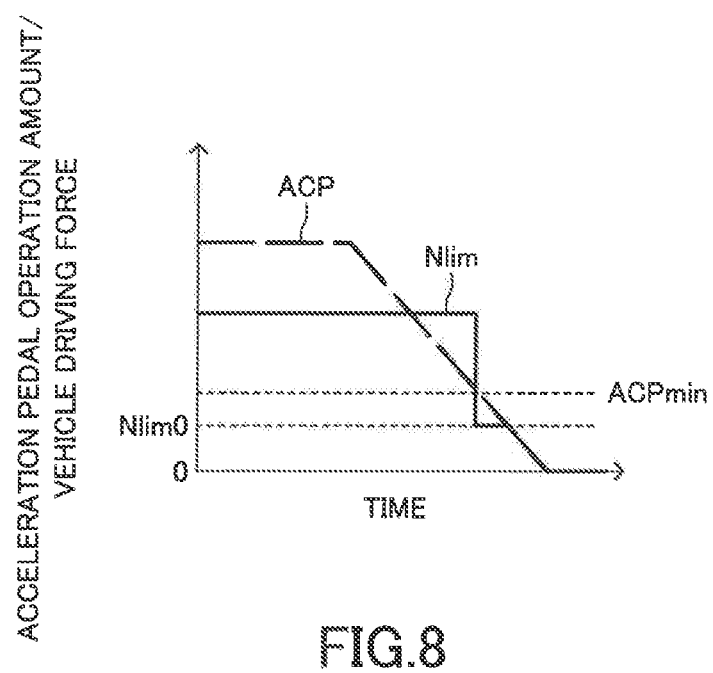
FIG. 8 is a view for showing a graph which shows the change of the acceleration pedal operation amount ACP and the change of the upper limit Nlim for limiting the vehicle driving force.
Figure 9:
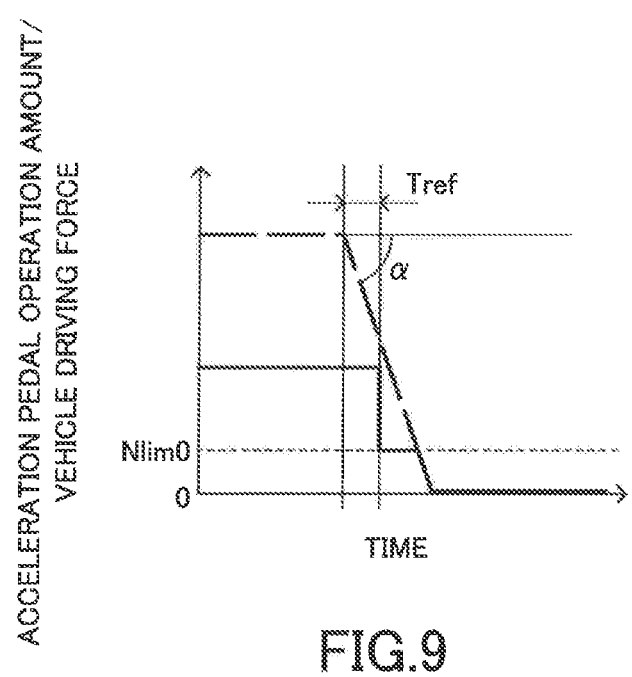
FIG. 9 is a view for showing a graph which shows the change of the acceleration pedal operation amount ACP and the change of the upper limit Nlim for limiting the vehicle driving force.

Alternatively, as shown in FIG. 8, the driving force ECU 10 determines whether the present acceleration pedal operation amount ACP decreases to a value equal to or smaller than a predetermined lower limit ACPmin. Hereinafter, a method of determining whether the present acceleration pedal operation amount ACP decreases to the value equal to or smaller than the predetermined lower limit ACPmin, will be referred to as "the second acceleration pedal release operation determination method". The lower limit ACPmin is set to a value larger than the acceleration pedal operation amount ACP corresponding to the initial upper limit Nlim0. Alternatively, as shown in FIG. 9, the driving force ECU 10 calculates an acceleration-pedal-operation-amount decrease speed ACVD corresponding to a decrease speed of the acceleration pedal operation amount ACP denoted by a gradient $\alpha$ in FIG. 9 and determines whether the acceleration-pedal-operation-amount decrease speed ACVD (the gradient $\alpha$) continues to be larger than a predetermined set decrease speed ACVDref (a gradient $\alpha$ref) for a period of time equal to or longer than a set period of time Tref. Hereinafter, a method of determining whether the acceleration-pedal-operation-amount decrease speed ACVD continues to be larger than the predetermined set decrease speed ACVDref for the period of time equal to or longer than the set period of time Tref, will be referred to as "the third acceleration pedal release operation determination method".

The determination process of the step S114 may be realized by using one of the first to third acceleration pedal release operation determination methods. Alternatively, the determination process of the step S114 may be realized by using two of the first to third acceleration pedal release operation determination methods. In this case, the driving force ECU 10 may determine that the acceleration pedal operation amount ACP decreases when the acceleration pedal release operation determination condition is satisfied in at least one of the two of the first to third acceleration pedal release operation determination methods. Alternatively, the determination process of the step S114 may be realized by using all of the first to third acceleration pedal release operation determination methods. In this case, the driving force ECU 10 may determine that the acceleration pedal operation amount ACP decreases when the acceleration pedal release operation determination condition is satisfied in at least one of all of the first to third acceleration pedal release operation determination methods.

When the acceleration pedal release operation determination condition is not satisfied (S114: No), the driving force ECU 10 proceeds with the process to a step S115 to determine whether a time of maintaining the driving force upper limit Nlim increased by the upper limit addition amount ΔNc, reaches the increased-upper-limit maintaining period of time Tc. When the time of maintaining the driving force upper limit Nlim increased by the upper limit addition amount ΔNc, does not reach the increased-upper-limit maintaining period of time Tc, the driving force ECU 10 returns the process to the step S114 to execute the processes described above again. Thereby, as shown in FIG. 6, the actual vehicle driving force N increases to the driving force upper limit Nlim and then, is maintained at the driving force upper limit Nlim. Thereby, the driving force limitation level is reduced.

When the driving force ECU 10 detects that the time of maintaining the driving force upper limit Nlim increased by the upper limit addition amount ΔNc, reaches the increased-upper-limit maintaining period of time Tc (S115: Yes), the driving force ECU 10 proceeds with the process to a step S116. On the other hand, when the acceleration pedal release operation determination condition is satisfied (S114: Yes) before the time of maintaining the driving force upper limit Nlim increased by the upper limit addition amount ΔNc, reaches the increased-upper-limit maintaining period of time Tc, the driving force ECU 10 proceeds with the process to a step S123. The first process corresponds to a set of the processes executed until the driving force ECU 10 detects that the time of maintaining the driving force upper limit Nlim increased by the upper limit addition amount ΔNc, reaches the increased-upper-limit maintaining period of time Tc at the step S115 after the driving force ECU 10 executes the process of the step S112. For example, in FIG. 6, the first process corresponds to the set of the processes executed from the time x2 to a time x3.

At the step S116, the driving force ECU 10 sets an amount of decreasing the driving force upper limit Nlim as an amount Δnc and sets a period of time for maintaining the driving force upper limit Nlim decreased by the amount Δnc as a period of time tc. A magnitude or an absolute value of the amount Δnc is smaller than a magnitude or an absolute value of the upper limit addition amount ΔNc. The driving force upper limit Nlim is decreased by the amount Δnc by executing a process of the step S116. The driving force ECU 10 has stored the amounts Δnc and the periods of time tc corresponding to the counter values c, respectively. Therefore, at the step S116, the amount Δnc and the period of time tc corresponding to the present counter value c, are set. Hereinafter, the amount Δnc will be referred to as "the upper limit subtraction amount Δnc", and the period of time tc will be referred to as "the decreased-upper-limit maintaining period of time tc".

In this case, the counter value c is used in place of the character "c" of the reference symbol "Δnc" denoting the upper limit subtraction amount. Also, the counter value c is used in place of the character "c" of the reference symbol "tc" denoting the decreased-upper-limit maintaining period of time. Therefore, the upper limit subtraction amount Δnc is "the upper limit subtraction amount Δn1". Also, the decreased-upper-limit maintaining period of time tc is "the decreased-upper-limit maintaining period of t1" when the counter value c is "1". When the process of the step S116 is first executed, the driving force upper limit Nlim corresponds to the value "Nlim0+ΔN1". Thus, at the step S116, the driving force upper limit Nlim is set to the value "Nlim0+ΔN1−Δn1".

The magnitude or the absolute value of the upper limit subtraction amount Δnc is smaller than the magnitude or the absolute value of the upper limit addition amount ΔNc. Therefore, the decreased driving force upper limit Nlim is larger than the initial upper limit Nlim0 used in the driving force limitation control.

For example, as shown in FIG. 6, at the time x3 when the increased-upper-limit maintaining period of time T1 elapses from the time x2, the driving force upper limit Nlim is set to a value acquired by subtracting the upper limit subtraction amount Δn1 from the present driving force upper limit Nlim (=Nlim0+ΔN1). Thus, the driving force upper limit Nlim is set to the value "Nlim0+ΔN1−Δn1". Thereby, the actual vehicle driving force N is decreased. Thereafter, when the actual vehicle driving force N reaches the driving force upper limit Nlim (=Nlim0+ΔN1−Δn1), the actual vehicle driving force N is maintained at the driving force upper limit Nlim. Thereby, the driving force limitation level is increased.

After the driving force ECU 10 executes a process for setting the upper limit subtraction amount Δnc and the decreased-upper-limit maintaining period of time tc at the step S116, the driving force ECU 10 proceeds with the process to a step S117 to determine whether the acceleration pedal operation amount ACP decreases on the basis of the predetermined acceleration pedal release operation determination condition is satisfied. A determination process of the step S117 is the same as the determination process of the step S114.

When the predetermined acceleration pedal release operation determination condition is not satisfied (S117: No), the driving force ECU 10 proceeds with the process to a step S118 to determine whether the time of maintaining the driving force upper limit Nlim decreased by the upper limit subtraction amount Δnc, reaches the decreased-upper-limit maintaining period of time tc. When the time of maintaining the driving force upper limit Nlim decreased by the upper limit subtraction amount nc, does not reach the decreased-upper-limit maintaining period of time tc, the driving force ECU 10 returns the process to the step S117 and executes the processes described above again.

When the driving force ECU 10 detects that the time of maintaining the driving force upper limit Nlim decreased by the upper limit subtraction amount Δnc, reaches the decreased-upper-limit maintaining period of time tc (S118: Yes), the driving force ECU 10 returns the process to the step S111. On the other hand, when the acceleration pedal release operation determination condition is satisfied (S117: Yes) before the time of maintaining the driving force upper limit Nlim decreased by the upper limit subtraction amount Δnc, reaches the decreased-upper-limit maintaining period of time tc, the driving force ECU 10 proceeds with the process to the step S123. The second process corresponds to a set of the processes executed until the driving force ECU 10 detects that the time of maintaining the driving force upper limit Nlim decreased by the upper limit subtraction amount nc, reaches the decreased-upper-limit maintaining period of time tc at the step S118 after the driving force ECU 10 executes the process of the step S116. For example, in FIG. 6, the second process corresponds to a set of the processes executed from the time x3 to a time x4.

When the acceleration pedal release operation determination condition is not satisfied, and the driving force ECU 10 returns the process to the step S111, the driving force ECU 10 increments the counter value c by "1". Thereby, the counter value c is changed from "1" to "2". Thereby, a second execution of the upper limit change process is started. In this case, the driving force ECU 10 sets the upper limit addition amount ΔN2 as the upper limit addition amount ΔNc and sets the increased-upper-limit maintaining period of time T2 as the increased-upper-limit maintaining period of time Tc.

For example, as shown in FIG. 6, when the upper limit addition amount ΔNc is set to the upper limit addition amount ΔN2, the driving force upper limit Nlim is set to a value acquired by adding the upper limit addition amount ΔN2 to the present driving force upper limit Nlim (=Nlim0+ΔN1+Δn1). Thus, the driving force upper limit Nlim is set to the value "Nlim0+ΔN1+Δn1+ΔN2".

A magnitude or an absolute value of the upper limit addition amount ΔN2 is larger than the magnitude or the absolute value of the upper limit subtraction amount Δn1. Therefore, the driving force upper limit Nlim set at a time of starting the second execution of the upper limit change process, is larger than the driving force upper limit Nlim set at a time of starting a first execution of the upper limit change process.

Then, the driving force ECU 10 proceeds with the process to the step S113 to determine whether the actual vehicle driving force N reaches the maximum upper limit Nlimend. When the actual vehicle driving force N does not reach the maximum upper limit Nlimend, the driving force ECU 10 proceeds with the process to the steps S114 and S115 to determine whether the acceleration pedal release operation determination condition is satisfied (S114), and a time elapsing from the time of starting the second execution of the upper limit change process, reaches the increased-upper-limit maintaining period of time T2 (S115).

As shown in FIG. 6, after the actual vehicle driving force N starts to increase at the time x4 and reaches the driving force upper limit Nlim (=Nlim0+ΔN1−Δn1+ΔN2) while the processes of the steps S114 and S115 are executed repeatedly, the actual vehicle driving force N is maintained at the driving force upper limit Nlim. Thereby, the driving force limitation level is further reduced, compared with the driving force limitation level in the first execution of the upper limit change process.

When the acceleration pedal release operation determination condition is not satisfied, and the time elapsing from the time of starting the second execution of the upper limit change process, reaches the increased-upper-limit maintaining period of time T2, the driving force ECU 10 proceeds with the process to the step S116 to set to the upper limit subtraction amount Δn2 as the upper limit subtraction amount Δnc and set the decreased-upper-limit maintaining period of time t2 as the decreased-upper-limit maintaining period of time tc.

For example, as shown in FIG. 6, when the upper limit subtraction amount Δnc is set to the upper limit subtraction amount Δn2 at a time x5, the driving force upper limit Nlim is set to a value acquired by subtracting the upper limit subtraction amount Δn2 from the present driving force upper limit Nlim (=Nlim0+ΔN1−Δn1+ΔN2). Thus, the driving force upper limit Nlim is set to the value "Nlim0+ΔN1−Δn1+ΔN2−Δn2".

Then, the driving force ECU 10 proceeds with the process to the steps S117 and S118 to determine whether the acceleration pedal release operation determination condition is satisfied (S117), and a time elapsing from the time of setting the upper limit subtraction amount Δn2 as the upper limit subtraction amount Δnc, reaches the decreased-upper-limit maintaining period of time t2 (S118).

As shown in FIG. 6, after the actual vehicle driving force N starts to decrease and reaches the driving force upper limit Nlim (=Nlim0+ΔN1−Δn1+ΔN2−Δn2) while the processes of the steps S117 and S118 are executed repeatedly, the actual vehicle driving force N is maintained at the driving force upper limit Nlim.

When the acceleration pedal release operation determination condition is not satisfied, and the time elapsing from the time of setting the upper limit subtraction amount Δn2 as the upper limit subtraction amount Δnc, reaches the decreased-upper-limit maintaining period of time t2 (S118: Yes), the driving force ECU 10 returns the process to the step S111. In this case, the counter value c is set to "3". Thereafter, the above-described processes are executed with the counter value "3" being applied to the character "c" of the reference symbols "ΔNc", "Tc", "Δnc", and "tc" denoting the upper limit addition amount, the increased-upper-limit maintaining period of time, the upper limit subtraction amount, and the decreased-upper-limit maintaining period of time, respectively.

There are relationships between the upper limit addition amount ΔNc and the upper limit subtraction amount Δnc as follows.

$$\Delta N1 > \Delta N2 = \Delta N3 = \ldots = \Delta Nx$$

$$\Delta Nx > \Delta nx$$

$$\Delta n1 = \Delta n2 = \ldots = \Delta nx$$

In the relationships described above, a character "x" is an integer value representing the optional counter value c. In this example, the upper limit addition amount ΔNc is constant when the counter value c is larger than or equal to "2". The upper limit subtraction amount Δnc is constant.

Further, there are relationships between the increased-upper-limit maintaining period of time Tc and the decreased-upper-limit maintaining period of time tc as follows.

$$T1 > T2 = T3 = \ldots = Tx$$

$$t1 > t2 = t3 = \ldots = tx$$

In this example, the increased-upper-limit maintaining period of time Tc is constant when the counter value c is larger than or equal to "2". Also, the decreased-upper-limit maintaining period of time tc is constant when the counter value c is larger than or equal to "2".

Therefore, as shown in FIG. 6, the driving force upper limit Nlim used in the second execution of the upper limit change process, is larger than the driving force upper limit Nlim used in the first execution of the upper limit change process. In particular, the driving force upper limit Nlim used in a second execution of the first process is larger than the driving force upper limit Nlim used in a first execution of the first process. Similarly, the driving force upper limit Nlim used in a second execution of the second process is larger than the driving force upper limit Nlim used in a first execution of the second process.

A relationship between the second execution of the upper limit change process and a third execution of the upper limit change process, is similar to the relationship between the first and second executions of the upper limit change process. As described above, as the number of executing the upper limit change process increases, the driving force upper limit Nlim used in the first process and the driving force upper limit Nlim used in the second process are increased, respectively. Therefore, the actual vehicle driving force N is increased as the number of executing the upper limit change process increases.

The driving force ECU 10 proceeds with the process to a step S119 when the actual vehicle driving force N reaches the maximum upper limit Nlimend (S113: Yes) while the driving force ECU 10 repeatedly executes the upper limit change processes.

At the step S119, the driving force ECU 10 determines whether the acceleration pedal operation amount ACP decreases. In other words, the driving force ECU 10 determines whether the acceleration pedal release operation determination condition is satisfied. A determination process of the step S119 is the same as the determination process of the step S114.

When the acceleration pedal release operation determination condition is not satisfied (S119: No), the driving force ECU 10 proceeds with the process to a step S120 to determine whether a time elapsing after the actual vehicle driving force N reaches the maximum upper limit Nlimend, reaches a predetermined set period of time Tlim. When the time elapsing after the actual vehicle driving force N reaches the maximum upper limit Nlimend, does not reach the predetermined set period of time Tlim, the driving force ECU 10 returns the process to the step S119.

When the acceleration pedal release operation determination condition is satisfied (S119: Yes) before the time elapsing after the actual vehicle driving force N reaches the maximum upper limit Nlimend, reaches the predetermined set period of time Tlim while the driving force ECU 10 repeatedly executes the processes of the steps S119 and S120, the driving force ECU 10 proceeds with the process to the step S123. On the other hand, when the time elapsing after the actual vehicle driving force N reaches the maximum upper limit Nlimend, reaches the predetermined set period of time Tlim (S120: Yes) without the acceleration pedal release operation determination condition being satisfied while the driving force ECU 10 repeatedly executes the processes of the steps S119 and S120, the driving force ECU 10 proceeds with the process to a step S121.

Figure 10:
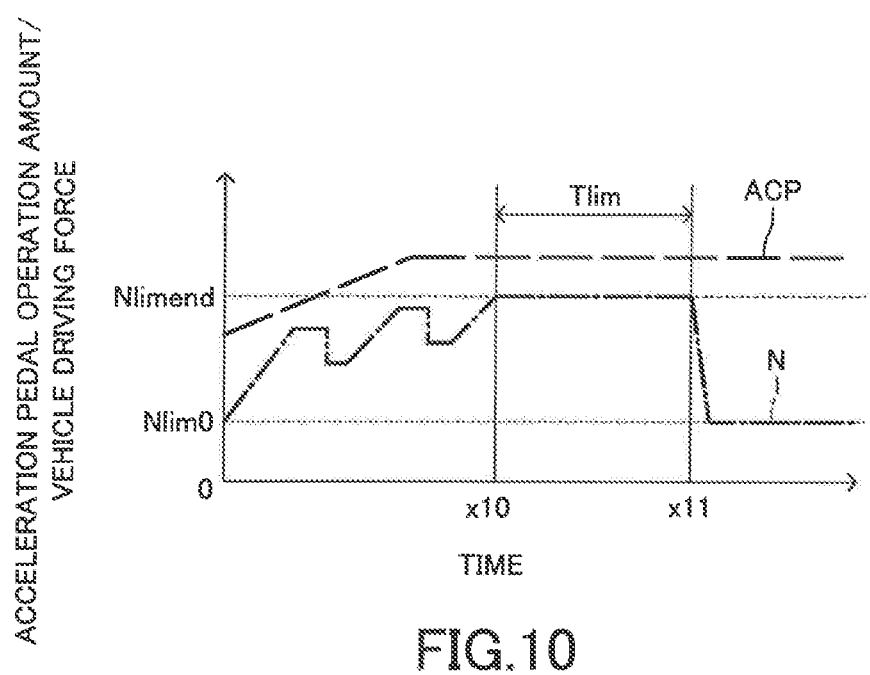
FIG. 10 is a view for showing a graph which shows the change of the acceleration pedal operation amount ACP and the change of the actual vehicle driving force N.

At the step S121, the driving force ECU 10 returns the driving force upper limit Nlim to the initial upper limit Nlim0. Thus, the process of reducing the driving force limitation level is terminated. For example, as shown in FIG. 10, the driving force upper limit Nlim is returned to the initial upper limit Nlim0 at a time x11 when the predetermined set period of time Tlim elapses from a time x10 when the actual vehicle driving force N reaches the maximum upper limit Nlimend.

Then, the driving force ECU 10 proceeds with the process to a step S122 to cause the indicator 26 to indicate the display for inducing the driver to turn off the assist selection switch 21 (i.e. a turn-off-operation-inducing display). In this case, the driving force ECU 10 outputs a turn-off-operation-inducing-display indication command to the indicator 26. Thereby, the indicator 26 indicates the turn-off-operation-inducing display.

For example, the vehicle may not move, passing the raised ground portion even when the limitation level reduction control is executed. In this case, the vehicle can move, passing the raised ground portion by terminating the mistaken press-down driving force control (i.e., executing the normal driving force control) and causing the vehicle driving apparatus 30 to generate the large vehicle driving force. There is a need to turn off the assist selection switch 21 to terminate the mistaken press-down driving force control. Accordingly, the driver is induced to turn off the assist selection switch 21 at the step S122.

After the driving force ECU 10 causes the indicator 26 to indicate the turn-off-operation-inducing display, the driving force ECU 10 proceeds with the process to the step S123. At the step S123, the driving force ECU 10 reduces the counter value c to "0" (c=0).

After the driving force ECU 10 executes a process of the step S123, the driving force ECU 10 terminates the limitation level reduction control and then, returns the process to the step S102 (i.e., the mistaken press-down driving force control routine shown in FIG. 3). Thereafter, the driving force limitation control is restarted.

When the driving force ECU 10 detects that the driver releases his/her foot from the acceleration pedal 22a (S103: Yes), or the assist selection switch 21 is turned off, the driving force ECU 10 proceeds with the process to the step S106 to terminate the alert to the driver and the mistaken press-down driving force control routine. Thereafter, the normal driving force control (S200 in FIG. 2) is restarted.

According to the vehicle driving force control apparatus of the embodiment described above, the driving force limitation control (S100) is first executed when the mistaken press-down operation is detected. Thereby, the vehicle may be prevented from starting to move suddenly. When the predetermined vehicle movement is not detected (S105: Yes) although the acceleration pedal 22a is pressed down after the driving force limitation control is started, the limitation level reduction control is started (S110). For example, the limitation level reduction control is started when a movement of the vehicle is blocked by the external obstacle against vehicle movement such as the raised ground portion.

When the limitation level reduction control is executed, the upper limit change process including the first process for reducing the driving force limitation level to a larger extent and the second process for reducing the driving force limitation level to a smaller extent, is executed repeatedly. In addition, as the number of executing the upper limit change process increases, the level of reducing the driving force limitation level by the first process and the level of reducing the driving force limitation level by the second process, are increased. Thereby, the level of reducing the driving force limitation level is increased gradually as a whole with the level of reducing the driving force limitation level being repeatedly switched between a large reduction level and a small reduction level. Therefore, the actual vehicle driving force N generated by the vehicle driving apparatus 30 increases gradually as a whole with the actual vehicle driving force N increasing and decreasing alternately. Thereby, the actual vehicle driving force N changes as if the driver operates the acceleration pedal 22a, adjusting the acceleration pedal operation amount ACP so as not to pass the raised ground portion roughly.

The vehicle moves, passing the external obstacle against vehicle movement when the vehicle driving force generated by the vehicle driving apparatus 30 overcomes the external obstacle against vehicle movement while the upper limit change process is executed repeatedly. After the vehicle moves, passing the external obstacle against vehicle movement, the driver releases his/her foot from the acceleration pedal 22a. Therefore, according to the vehicle driving force control apparatus of the embodiment, the vehicle driving force necessary for the vehicle to move, passing the external obstacle against vehicle movement, can be generated. Thus, the vehicle can move, passing the external obstacle against vehicle movement such as the raised ground portion appropriately. In other words, the vehicle can pass the external obstacle against vehicle movement so as not to pass the external obstacle against vehicle movement roughly. Thus, the driver may not have a discomfort feeling. In addition, the vehicle can pass the raised ground portion as the driver desires.

The upper limit change process is terminated when an operation of releasing the acceleration pedal 22a is detected, i.e., the acceleration pedal release operation determination condition is satisfied while the upper limit change process is executed. When the operation of releasing the acceleration pedal 22a is performed, the driver does not request the large vehicle driving force. Therefore, the process of reducing the driving force limitation level may be terminated at an appropriate timing. Thereby, the driving force limitation control may be restarted promptly. In other words, the vehicle driving force may be decreased to the initial upper limit Nlim0 when the acceleration pedal release operation determination condition is satisfied without the amount of operating the acceleration pedal 22a returning to the acceleration pedal operation amount ACP corresponding to the initial upper limit Nlim0.

Further, the operation of releasing the acceleration pedal 22a is used for determining whether to terminate the limitation level reduction control without determining whether the vehicle speed V is larger than or equal to a predetermined speed, i.e., whether the vehicle starts to move. Thus, the limitation level reduction control can be prevented from being terminated earlier than necessary due to unstable vehicle speed. Therefore, the process of reducing the driving force limitation level may be terminated at the appropriate timing.

The upper limit change process is terminated, and the driver is induced to turn off the assist selection switch 21 when the actual vehicle driving force N reaches the maximum upper limit Nlimend without detecting the operation of releasing the acceleration pedal 22a while the upper limit change process is executed. Thereby, the driver can cause the vehicle driving apparatus 30 to generate the large vehicle driving force by turning off the assist selection switch 21 to terminate the driving force limitation control. Therefore, the vehicle can pass the large external obstacle against vehicle movement such as the largely-raised ground portion appropriately.

In addition, the maximum upper limit Nlimend is set to a value increasing as the acceleration pedal operation amount ACP increases. Thus, it can be ensured that the process of reducing the driving force limitation level is terminated at the appropriate timing.

Further, the upper limit addition amount ΔN1 used in the first execution of the first process after the limitation level reduction control is started, is larger than the upper limit addition amounts ΔN2 used in executions of the first process subsequent to the first execution of the first process. In addition, the increased-upper-limit maintaining period of time T1 used in the first execution of the first process, is longer than the increased-upper-limit maintaining period of time T2 used in the executions of the first process subsequent to the first execution of the first process. Thus, the actual vehicle driving force N may be increased promptly at the beginning of the execution of the limitation level reduction control. Thereby, a capability of the vehicle to pass the external obstacle against vehicle movement such as a capability of the vehicle to pass the raised ground portion promptly, may be increased. Further, the level of reducing the driving force limitation level is reduced by the second process when the vehicle does not pass the raised ground portion by the first execution of the first process after the limitation level reduction control is started. Thus, the driving force limitation level is reduced gradually as a whole. Therefore, the vehicle can be prevented from starting to move suddenly. In particular, the vehicle can be prevented from passing the raised ground portion roughly.

First Modified Example

Figure 11:
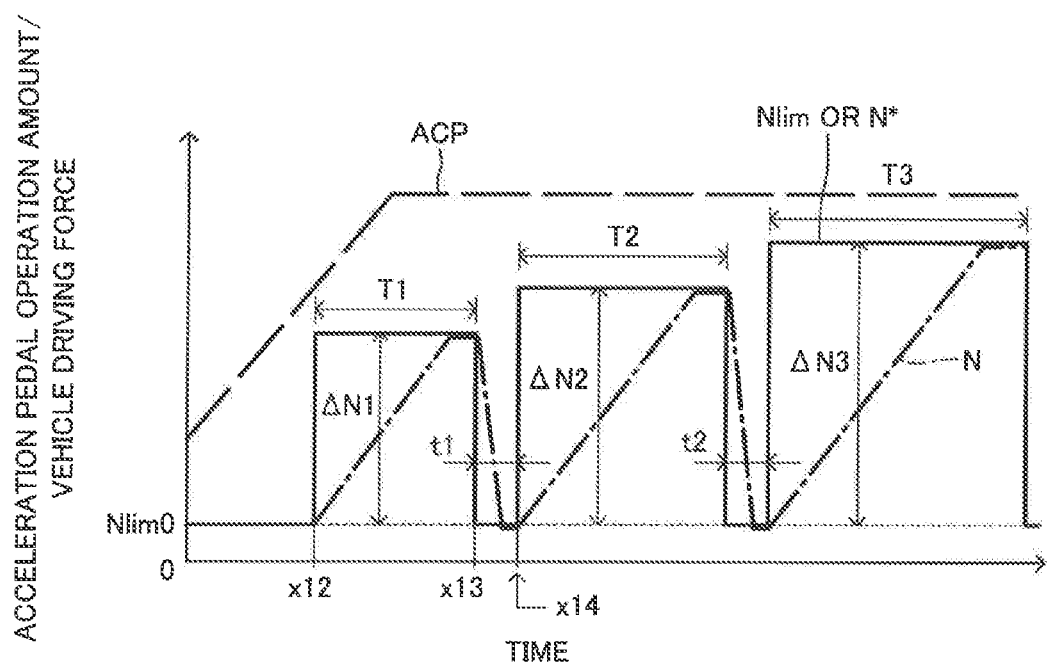
FIG. 11 is a view for showing a graph which shows the change of the acceleration pedal operation amount ACP, the change of the upper limit Nlim for limiting the vehicle driving force, and the change of the actual vehicle driving force N according to a first modified example of the embodiment.

According to the embodiment described above, the driving force upper limit Nlim used in the second process is set to a value larger than the initial upper limit Nlim0. According to a first modified example of the embodiment, as shown in FIG. 11, the driving force upper limit Nlim used in the second process is set to the initial upper limit Nlim0. For example, as shown in FIG. 11, the first process is executed from a time x12 to a time x13, and the second process is executed from a time x13 to a time x14. The driving force upper limit Nlim used in the second process is set to the initial upper limit Nlim0.

Therefore, according to the first modified example, at the step S116 of the driving force limitation level reduction routine shown in FIG. 4, the upper limit subtraction amount Δnc is set to a value equal to the upper limit addition amount ΔN1 used just before the step S116. Alternatively, the driving force upper limit Nlim may be set directly to the initial upper limit Nlim0.

There are relationships among the upper limit addition amount ΔNc, the increased-upper-limit maintaining period of time Tc, and the decreased-upper-limit maintaining period of time tc as follows.

$$\Delta N1 < \Delta N2 < \Delta N3 < \ldots < \Delta Nx$$

$$T1 < T2 < T3 < \ldots < Tx$$

$$t1 < t2 < t3 < \ldots < tx$$

Based on the relationships described above, the driving force upper limit Nlim and the increased-upper-limit maintaining period of time Tc used in the first process are increased as the number of executing the upper limit change process increases. Therefore, the actual vehicle driving force N is increased as the number of executing the upper limit change process increases. Thereby, similar to the embodiment, according to the first modified example, the vehicle can pass the external obstacle against vehicle movement such as the raised ground portion appropriately.

Second Modified Example

According to the embodiment described above, the driving force limitation level is reduced by setting the driving force upper limit Nlim to a value larger than the initial upper limit Nlim0 in the limitation level reduction control. According to a second modified example of the embodiment, the driving force limitation level is reduced by setting the target value N* of the vehicle driving force to a value larger than the initial upper limit Nlim0 without setting the driving force upper limit Nlim to a value larger than the initial upper limit Nlim0. Hereinafter, the target value N* will be referred to as "the target driving force N*".

For example, the target driving force N* may be set in the same manner as the driving force upper limit Nlim shown in FIG. 6. Therefore, the target driving force N* is set to a value acquired by adding the upper limit addition amount ΔN1 to the initial upper limit Nlim0 in a first execution of the process of the step S112. In addition, a time of maintaining the target driving force N* set at the step S112, is set to the increased-upper-limit maintaining period of time T1 in the first execution of the process of the step S112. When the increased-upper-limit maintaining period of time T1 elapses, the target driving force N* is set to a value acquired by subtracting the upper limit subtraction amount Δn1 from the currently-set target driving force N* (=Nlim0+ΔN1) at the step S116. Thus, the target driving force N* is set to the value "Nlim0+ΔN1−Δn1". In addition, the time of maintaining the newly-set target driving force N*, is set to the decreased-upper-limit maintaining period of time t1 at the step S116. Then, the first execution of the upper limit change process is terminated. Similar to the first execution of the upper limit change process, the target driving force N* is set, using the upper limit addition amount ΔNc, the increased-upper-limit maintaining period of time Tc, the upper limit subtraction amount Δnc, and the decreased-upper-limit maintaining period of time tc in each of the upper limit change processes subsequent to the first execution of the upper limit change process.

The driving force ECU 10 controls the vehicle driving force generated by the vehicle driving apparatus 30 such that the actual vehicle driving force N approaches the target driving force N*. Thereby, the actual vehicle driving force N can be increased, similar to the embodiment.

The second modified example can be applied to the first modified example. In particular, the target driving force N* may be set in the same manner as the driving force upper limit Nlim shown in FIG. 11.

The vehicle driving force control apparatus according to any of the embodiment and the modified examples, has been described. In this regard, the invention is not limited to the aforementioned embodiment and the modified examples, and various modifications can be employed within the scope of the present invention.

For example, according to the embodiment, a process of determining whether the actual vehicle driving force N reaches the maximum upper limit Nlimend, is executed at the step S113. In place of this process, a process of determining whether the driving force upper limit Nlim calculated on the basis of the upper limit addition amount ΔNc set at the step S112, reaches the maximum upper limit Nlimend, may be executed at the step S113. Alternatively, a process of determining whether the target driving force N* reaches a limitation level reduction end upper limit N*end at the step S113.

Further, in the embodiment, the internal combustion engine is used as the vehicle driving apparatus 30. In this regard, in place of the internal combustion engine, an electric motor may be used as the vehicle driving apparatus 30. Alternatively, a driving apparatus including the internal combustion engine and the electric motor may be used as the vehicle driving apparatus 30.

Further, the level of reducing the driving force limitation level may be set previously by the driver. For example, when an operation device (not shown) for setting the level of reducing the driving force limitation level is installed in the vehicle, the driving force ECU 10 may set the upper limit addition amount ΔNc, the upper limit subtraction amount Δnc, the increased-upper-limit maintaining period of time Tc, and the decreased-upper-limit maintaining period of time tc on the basis of the level of reducing the driving force limitation level set by the driver operating the operation device.

What is claimed is:

1. A vehicle driving force control apparatus, applied to a vehicle comprising an acceleration pedal and a vehicle driving apparatus which generates driving force for moving a vehicle,
the vehicle driving force control apparatus comprising:
a sensor for detecting an amount of an operation of the acceleration pedal as an acceleration pedal operation amount; and
an electronic control unit for controlling the driving force generated by the vehicle driving apparatus,
wherein the electronic control unit is configured to:
execute a mistaken press-down driving force control for setting one of an upper limit and a target value of the driving force generated by the vehicle driving apparatus as an initial upper limit and limiting the generated driving force to the initial upper limit when the electronic control unit detects a mistaken press-down operation that a driver of the vehicle presses down the acceleration pedal mistakenly on the basis of a predetermined mistaken press-down determination condition; and
execute a limitation level reduction control when the electronic control unit does not detect a predetermined movement of the vehicle while the electronic control unit executes the mistaken press-down driving force control, and the acceleration pedal is operated, and
wherein the electronic control unit is configured to execute the limitation level reduction control by:
repeatedly executing an upper limit change process for executing a first process for setting a first upper limit to a value larger than the initial upper limit and limiting the generated driving force to the first upper limit for a first period of time and then, a second process for setting a second upper limit to a value smaller than the first upper limit and equal to or larger than the initial upper limit and limiting the generated driving force to the second upper limit for a second period of time; and
increasing the first upper limit as the number of executing the upper limit change process increases.

2. The driving vehicle force control apparatus as set forth in claim 1, wherein the electronic control unit is configured to terminate the limitation level reduction control when the acceleration pedal operation amount decreases while the electronic control unit executes the limitation level reduction control.

3. The vehicle driving force control apparatus as set forth in claim 1, wherein the electronic control unit is configured to terminate the limitation level reduction control when the first upper limit reaches a maximum upper limit while the electronic control unit executes the limitation level reduction control.

4. The vehicle driving force control apparatus as set forth in claim 3, wherein the electronic control unit is configured to set the maximum upper limit to a value increasing as the acceleration pedal operation amount increases.

5. The vehicle driving force control apparatus as set forth in claim 3, wherein
the vehicle driving apparatus further comprises an operation device operated by the driver to request the electronic control unit to terminate the mistaken press-down driving force control and the limitation level reduction control, and
the electronic control unit is configured to induce the driver to operate the operation device to request the electronic control unit to terminate the mistaken press-down driving force control and the limitation level reduction control when the first upper limit reaches the maximum upper limit.

6. The vehicle driving force control apparatus as set forth in claim 1, wherein the electronic control unit is configured to determine that the predetermined movement of the vehicle is not detected when the acceleration pedal operation amount is equal to or larger than a predetermined base amount, or the generated driving force is equal to or larger than a predetermined base force, and a movement speed of the vehicle is equal to or smaller than a predetermined base speed for a predetermined base period of time or more while the electronic control unit executes the mistaken press-down driving force control, and the acceleration pedal is operated.

7. The vehicle driving force control apparatus as set forth in claim 1, wherein the electronic control unit is configured to:
  set the first upper limit to a value acquired by adding a predetermined upper limit addition amount to the initial upper limit in the first-executed first process after the electronic control unit starts to execute the limitation level reduction control; and
  set the first upper limit to a value acquired by adding the predetermined upper limit addition amount to the lastly-set second upper limit in the first process subsequent to the first-executed first process; and
  set the predetermined upper limit addition amount to a value depending on the number of executing the upper limit change process.

8. The vehicle driving force control apparatus as set forth in claim 7, wherein the electronic control unit is configured to set the predetermined upper limit addition amount used in the first-executed first process, to an amount larger than the predetermined upper limit addition amount used in the first process subsequent to the first-executed first process.

9. The vehicle driving force control apparatus as set forth in claim 1, wherein the electronic control unit is configured to set the second upper limit to a value smaller than the lastly-set first upper limit and equal to or larger than the initial upper limit.

10. The vehicle driving force control apparatus as set forth in claim 1, wherein the electronic control unit is configured to set the second upper limit to a value increasing as the number of executing the upper limit change process increases.

11. The vehicle driving force control apparatus as set forth in claim 1, wherein the electronic control unit is configured to set the second upper limit to the initial upper limit.

12. The vehicle driving force control apparatus as set forth in claim 1, wherein the electronic control unit is configured to set the first period of time to a time depending on the number of executing the upper limit change process.

13. The vehicle driving force control apparatus as set forth in claim 12, wherein the electronic control unit is configured to set the first period of time to a time increasing as the number of executing the upper limit change process increases.

14. The vehicle driving force control apparatus as set forth in claim 1, wherein the electronic control unit is configured to set the first period of time used in the first-executed first process after the electronic control unit starts to execute the limitation level reduction control, to a time longer than the first period of time used in the first process subsequent to the first-executed first process.

\* \* \* \* \*